(12) United States Patent
Raveendran et al.

(10) Patent No.: US 8,842,666 B2
(45) Date of Patent: Sep. 23, 2014

(54) METHODS AND APPARATUS FOR PACKETIZATION OF CONTENT FOR TRANSMISSION OVER A NETWORK

(75) Inventors: Vijayalakshmi R. Raveendran, San Diego, CA (US); Amnon Silberger, La Jolla, CA (US); Bruce Collins, San Diego, CA (US); Dhinakar Radhakrishnan, San Diego, CA (US); Gordon Kent Walker, Poway, CA (US); Thadi M. Nagaraj, San Diego, CA (US); Sajith Balraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1133 days.

(21) Appl. No.: 11/432,005

(22) Filed: May 11, 2006

(65) Prior Publication Data

US 2006/0288117 A1  Dec. 21, 2006

Related U.S. Application Data

(60) Provisional application No. 60/680,786, filed on May 13, 2005, provisional application No. 60/680,907, filed on May 13, 2005, provisional application No. 60/798,110, filed on May 4, 2006.

(51) Int. Cl.
*H04L 12/28* (2006.01)
*H04L 12/66* (2006.01)
*H04L 29/06* (2006.01)

(52) U.S. Cl.
CPC ............ *H06L 65/4084* (2013.01); *H04L 12/66* (2013.01); *H04L 29/06027* (2013.01); *H04L 65/607* (2013.01); *H04L 69/22* (2013.01); *H04L 69/28* (2013.01)
USPC ........... 370/389; 473/475; 473/476; 473/470; 473/349; 473/350

(58) Field of Classification Search
None
See application file for complete search history.

(56) References Cited

U.S. PATENT DOCUMENTS

| 5,652,749 | A | 7/1997 | Davenport et al. |
| 5,682,384 | A | 10/1997 | Zarros |

(Continued)

FOREIGN PATENT DOCUMENTS

| KR | 1020040085591 | 10/2004 |
| TW | 429719 | 4/2001 |
| TW | 573414 | 1/2004 |

OTHER PUBLICATIONS

Hyun-Cheol Kim, Design and Implementation of Streaming Systeam for MPEG-4 Based Interactive Contents over IP Networks, Nov. 2002, pp. 1-8.*

(Continued)

*Primary Examiner* — Kibrom T Hailu
(74) *Attorney, Agent, or Firm* — Fulbright & Jaworski LLP

(57) ABSTRACT

Methods and apparatus for packetization of content for transmission over a network. A method is provided that includes generating one or more content packets from the multimedia content, wherein the content packets are associated with a time reference, and adding a sync header to the one or more content packets to form one or more application layer packets, respectively, wherein the sync header comprises a time indicator that indicates time relative to the time reference. An apparatus includes encoding logic configured to generate one or more content packets from the multimedia content, wherein the content packets are associated with a time reference, and packetization logic configured to add a sync header to the one or more content packets to form one or more application layer packets, respectively, wherein the sync header comprises a time indicator that indicates time relative to the time reference.

64 Claims, 14 Drawing Sheets

(56) References Cited

U.S. PATENT DOCUMENTS

| | | | |
|---|---|---|---|
| 5,845,089 A | 12/1998 | Ohira et al. | |
| 6,501,743 B1 | 12/2002 | Kim et al. | |
| 6,611,529 B1 | 8/2003 | Krishnakumar et al. | |
| 6,778,493 B1 | 8/2004 | Ishii | |
| 6,851,084 B2 | 2/2005 | Pattavina | |
| 6,873,629 B2 | 3/2005 | Morris | |
| 7,263,644 B2 | 8/2007 | Park et al. | |
| 7,302,169 B2 * | 11/2007 | Ihara | 386/124 |
| 7,336,646 B2 * | 2/2008 | Muller | 370/350 |
| 7,406,104 B2 * | 7/2008 | Yang et al. | 370/509 |
| 7,444,419 B2 * | 10/2008 | Green | 709/231 |
| 2002/0099854 A1 * | 7/2002 | Jorgensen | 709/249 |
| 2002/0150053 A1 * | 10/2002 | Gray et al. | 370/252 |
| 2003/0041159 A1 * | 2/2003 | Tinsley et al. | 709/231 |
| 2003/0053486 A1 | 3/2003 | Okamori | |
| 2003/0133502 A1 * | 7/2003 | Yagasaki et al. | 375/240.13 |
| 2004/0103430 A1 * | 5/2004 | Lee et al. | 725/32 |
| 2004/0133569 A1 * | 7/2004 | Munetsugu et al. | 707/3 |
| 2004/0190629 A1 * | 9/2004 | Cooper et al. | 375/240.26 |
| 2005/0036519 A1 * | 2/2005 | Balakrishnan et al. | 370/503 |
| 2005/0099869 A1 | 5/2005 | Crinon et al. | |
| 2005/0105555 A1 * | 5/2005 | Oshima | 370/469 |
| 2005/0204385 A1 * | 9/2005 | Sull et al. | 725/45 |
| 2007/0074267 A1 * | 3/2007 | Clerget et al. | 725/136 |

OTHER PUBLICATIONS

ITU-T H.264 (Mar. 2005), Series H: Audiovisual and Multimedie Systems Infrastructure of audiovisual services—Coding of moving video, Advanced video coding for generic audiovisual services.

International Search Report—PCT/US06/018850, International Search Authority—US, Dec. 19, 2007.

Written Opinion—PCT/US06/018850, International Search Authoruty—US, Dec. 19, 2007.

International Preliminary Report on Patentability, PCT/US2006/018850—The International Bureau of WIPO—Geneva, Switzerland, Mar. 17, 2009.

Taiwanese Search Report—09511705—TIPO—Jul. 17, 2009.

\* cited by examiner

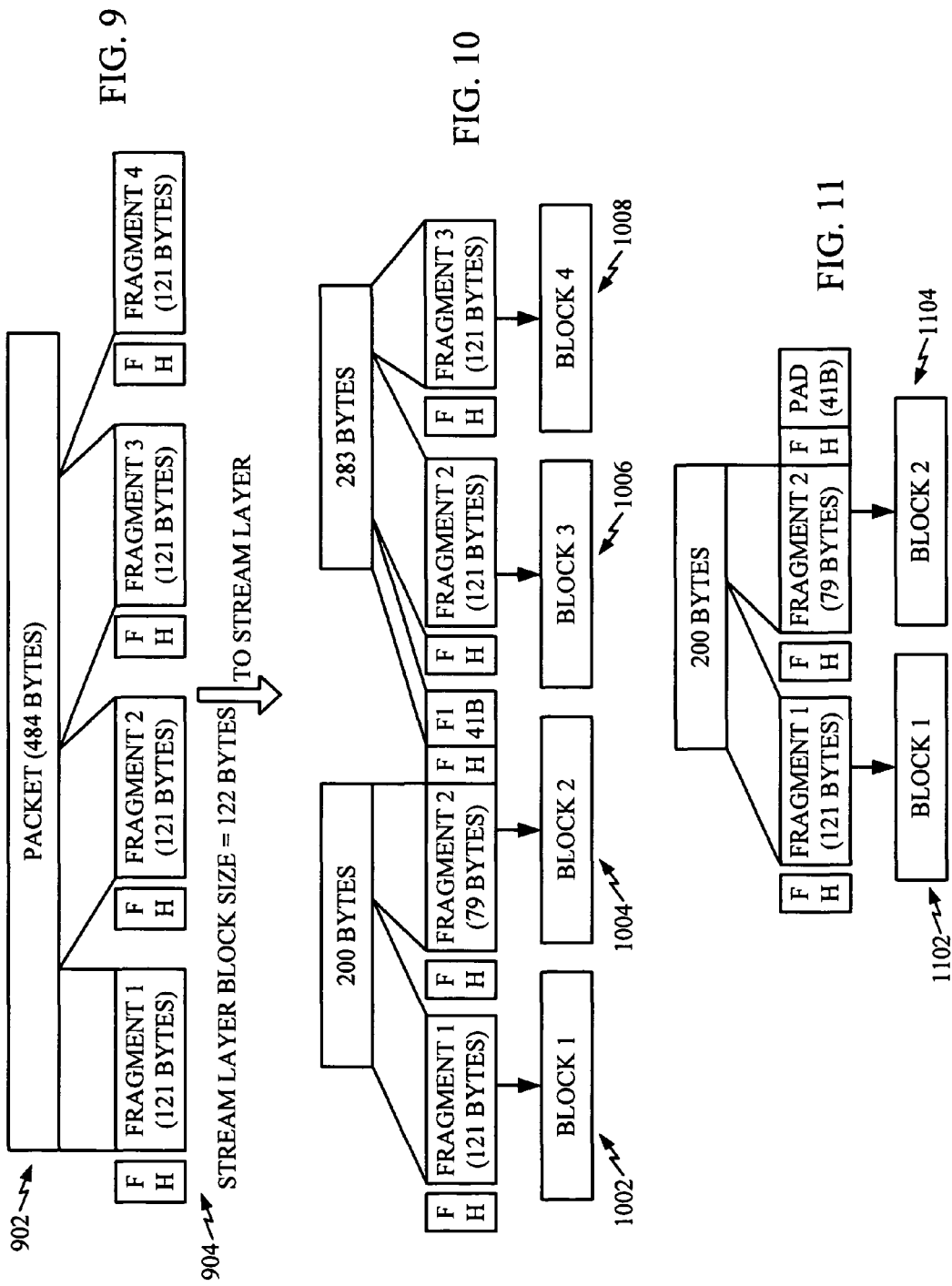

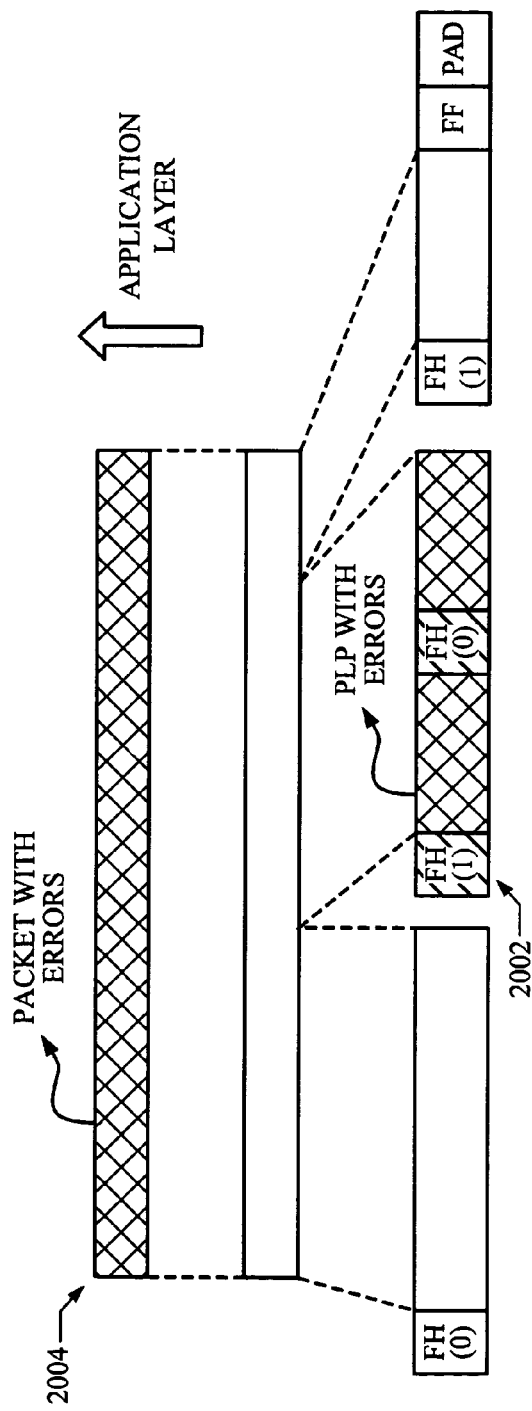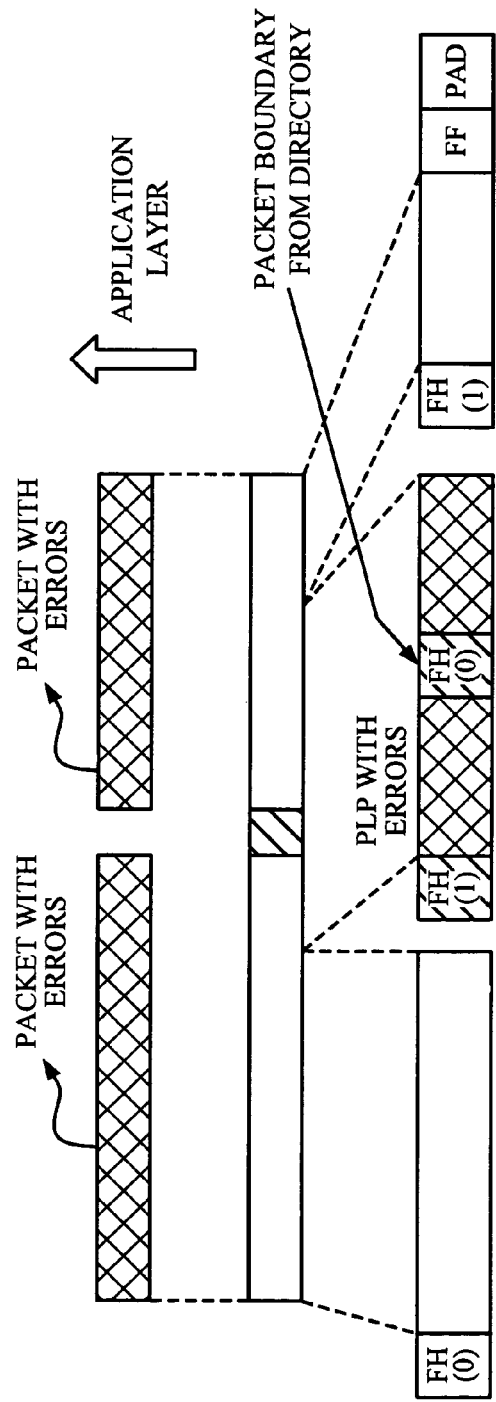

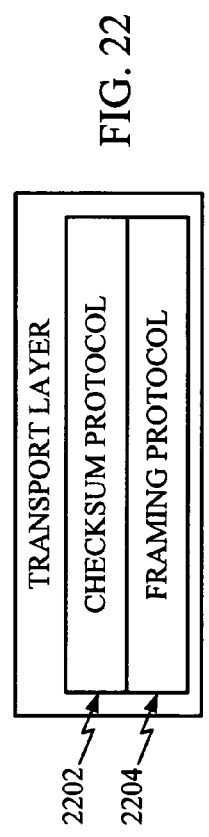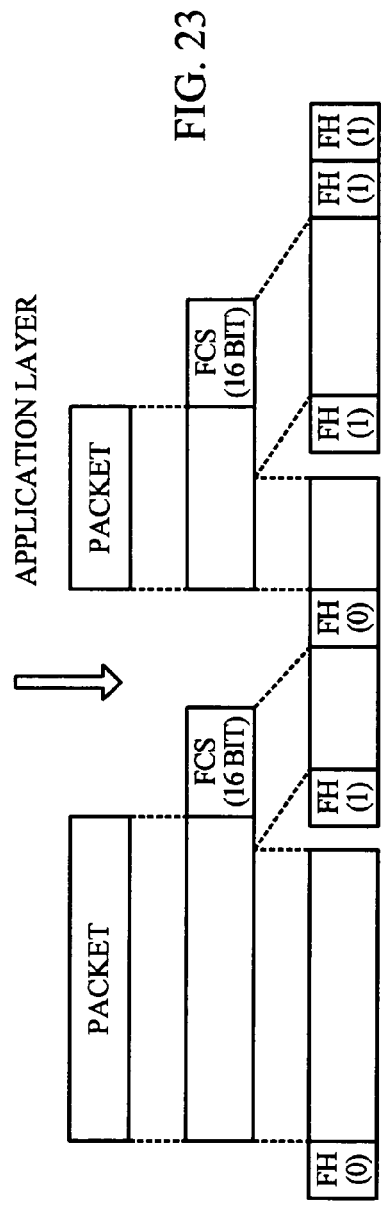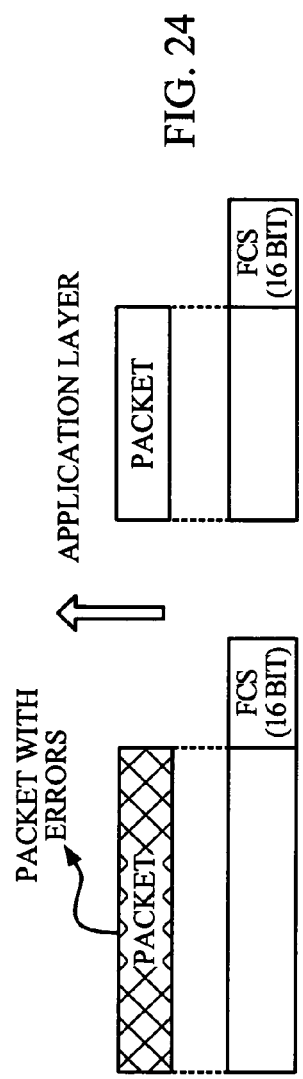

METHODS AND APPARATUS FOR PACKETIZATION OF CONTENT FOR TRANSMISSION OVER A NETWORK

CLAIM OF PRIORITY UNDER 35 U.S.C. §119)

The present Application for Patent claims priority to Provisional Application No. 60/680,786, filed May 13, 2005, and assigned to the assignee hereof and hereby expressly incorporated by reference herein.

The present Application for Patent claims priority to Provisional Application No. 60/680,907, "filed May 13, 2005, and assigned to the assignee hereof and hereby expressly incorporated by reference herein.

The present Application for Patent claims priority to Provisional Application No. 60/798,110 entitled "MULTIMEDIA AUDIO AND VIDEO" filed May 4, 2006, and assigned to the assignee hereof and hereby expressly incorporated by reference herein.

BACKGROUND

1. Field

The present Application relates generally to the distribution of content over a distribution network, and more particularly, to methods and apparatus for packetization of content for distribution over a distribution network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner for presentation on networked devices.

In current content delivery/media distribution systems, real time and non real time services are packed into a transmission frame and delivered to devices on a network. For example, a communication network may utilize Orthogonal Frequency Division Multiplexing (OFDM) to provide communications between a network server and one or more mobile devices. This technology provides a transmission frame having data slots that are packed with services to be delivered and transmitted over a distribution network.

Unfortunately, conventional system may have problems when transmitting packets over error-prone multicast networks. For example, if packets are damaged or lost during transmission, a receiving device may not be able to recover the transmitted content. Even if the content is received without errors, conventional system may not be able to efficiently synchronize its presentation.

Therefore, what is needed is a system to efficiently transmit content over a data network that overcomes the problems of conventional systems. The system should operate to allow content to be delivered over error-prone networks and provide a way to synchronize its presentation.

SUMMARY

In one or more embodiments, a packetization system, comprising methods and apparatus, is provided that operates to efficiently packetize one or more content flows for transmission over error-prone networks. For example, in an aspect, a fragmentation scheme and associated error handling mechanism are provided to allow a receiver to reassemble packets and to mark upper layer packets as erroneous when the received blocks are marked as erroneous. The system also provides time indicators as a means of time synchronization between pieces of media data. Thus, the system provides an error resilient media synchronization mechanism.

In an aspect, a method is provided for packetization of multimedia content for distribution over a network. The method comprises generating one or more content packets from the multimedia content, wherein the content packets are associated with a time reference. The method also comprises adding a sync header to the one or more content packets to form one or more application layer packets, respectively, wherein the sync header comprises a time indicator that indicates time relative to the time reference.

In an aspect, an apparatus is provided for packetization of multimedia content for distribution over a network. The apparatus comprises encoding logic configured to generate one or more content packets from the multimedia content, wherein the content packets are associated with a time reference. The apparatus also comprises packetization logic configured to add a sync header to the one or more content packets to form one or more application layer packets, respectively, wherein the sync header comprises a time indicator that indicates time relative to the time reference.

In an aspect, an apparatus is provided for packetization of multimedia content for distribution over a network. The apparatus comprises means for generating one or more content packets from the multimedia content, wherein the content packets are associated with a time reference. The apparatus also comprises means for adding a sync header to the one or more content packets to form one or more application layer packets, respectively, wherein the sync header comprises a time indicator that indicates time relative to the time reference.

In an aspect, a computer-readable medium is provided that has a computer program comprising one or more instructions, which when executed by at least one processor, operates to provide packetization of multimedia content for distribution over a network. The computer program comprises instructions for generating one or more content packets from the multimedia content, wherein the content packets are associated with a time reference. The computer program also comprises instructions for adding a sync header to the one or more content packets to form one or more application layer packets, respectively, wherein the sync header comprises a time indicator that indicates time relative to the time reference.

In an aspect, at least one processor configured to perform a method for packetization of multimedia content for distribution over a network. The method comprises generating one or more content packets from the multimedia content, wherein the content packets are associated with a time reference. The method also comprises adding a sync header to the one or more content packets to form one or more application layer packets, respectively, wherein the sync header comprises a time indicator that indicates time relative to the time reference.

In an aspect, a method for packetization of multimedia content for distribution over a network. The method comprises processing one or more content blocks to produce one or more application layer packets, and extracting a sync header from the one or more application layer packets to produce one or more content layer packets, respectively, wherein the sync header comprises a time indicator that indicates time relative to a time reference. The method also comprises synchronizing the one or more content layer packets based on the time indicator.

In an aspect, an apparatus is provided for packetization of multimedia content for distribution over a network. The apparatus comprises receiving logic configured to process one or more content blocks to produce one or more application layer packets. The apparatus also comprises de-packetization logic configured to extract a sync header from the one or more application layer packets to produce one or more content layer packets, respectively, wherein the sync header comprises a time indicator that indicates time relative to a time reference, and to synchronize the one or more content layer packets based on the time indicator.

In an aspect, an apparatus for packetization of multimedia content for distribution over a network. The apparatus comprises means for processing one or more content blocks to produce one or more application layer packets, and means for extracting a sync header from the one or more application layer packets to produce one or more content layer packets, respectively, wherein the sync header comprises a time indicator that indicates time relative to a time reference. The apparatus also comprises means for synchronizing the one or more content layer packets based on the time indicator.

In an aspect, a computer-readable medium is provided that has a computer program comprising instructions, which when executed by at least one processor, operate to provide packetization of multimedia content for distribution over a network. The computer program comprises instructions for processing one or more content blocks to produce one or more application layer packets, and instructions for extracting a sync header from the one or more application layer packets to produce one or more content layer packets, respectively, wherein the sync header comprises a time indicator that indicates time relative to a time reference. The computer program also comprises instructions for synchronizing the one or more content layer packets based on the time indicator.

In an aspect, at least one processor is provided that is configured to perform a method for packetization of multimedia content for distribution over a network. The method comprises processing one or more content blocks to produce one or more application layer packets, and extracting a sync header from the one or more application layer packets to produce one or more content layer packets, respectively, wherein the sync header comprises a time indicator that indicates time relative to a time reference. The method also comprises synchronizing the one or more content layer packets based on the time indicator.

In an aspect, a method is provided for packetization of multimedia content for distribution over a network. The method comprises receiving one or more content blocks, wherein the one or more content blocks comprises a frame header, and determining that a selected content block includes an error. The method also comprises assuming that a selected frame header associated with the selected content block comprises one or more selected values, and processing the one or more content blocks to produce one or more application layer packets.

In an aspect, an apparatus is provided for packetization of multimedia content for distribution over a network. The apparatus comprises input logic configured to receiving one or more content blocks, wherein the one or more content blocks comprises a frame header. The apparatus also comprises de-packetization logic configured to determine that a selected content block includes an error, assume that a selected frame header associated with the selected content block comprises one or more selected values, and process the one or more content blocks to produce one or more application layer packets.

In an aspect, an apparatus is provided for packetization of multimedia content for distribution over a network. The apparatus comprises means for receiving one or more content blocks, wherein the one or more content blocks comprises a frame header, and means for determining that a selected content block includes an error. The apparatus also comprises means for assuming that a selected frame header associated with the selected content block comprises one or more selected values, and means for processing the one or more content blocks to produce one or more application layer packets.

In an aspect, a computer-readable medium is provided that has a computer program comprising instructions, which when executed by at least one processor, operates to provide packetization of multimedia content for distribution over a network. The computer program comprises instructions for receiving one or more content blocks, wherein the one or more content blocks comprises a frame header, and instructions for determining that a selected content block includes an error. The computer program also comprises instructions for assuming that a selected frame header associated with the selected content block comprises one or more selected values, and instructions for processing the one or more content blocks to produce one or more application layer packets.

In an aspect, at least one processor is provided that is configured to perform a method for packetization of multimedia content for distribution over a network. The method comprises receiving one or more content blocks, wherein the one or more content blocks comprises a frame header, and determining that a selected content block includes an error. The method also comprises assuming that a selected frame header associated with the selected content block comprises one or more selected values, and processing the one or more content blocks to produce one or more application layer packets.

Other aspects of the embodiments will become apparent after review of the hereinafter set forth Brief Description of the Drawings, Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein:

FIG. 9 shows a fragmentation scheme for a single packet provided by an embodiment of the Framing protocol;

FIG. 10 illustrates how an embodiment of a Framing protocol operates to fragment two packets;

FIG. 11 illustrates how an embodiment of a Framing protocol operates to fragment an upper layer packet of size 200 bytes into two parts;

FIG. 20 shows the operation of a packetization system where a Stream layer delivers three blocks to the Transport layer;

FIG. 21 shows the operation of a packetization system where Framing directory information is used at a receiving device;

FIG. 22 shows protocols belonging to the Transport layer;

FIG. 23 shows how a Checksum protocol is provided on a server in a packetization system;

FIG. 24 illustrates checksum processing at a receiving device in a packetization system;

DETAILED DESCRIPTION

In one or more embodiments, a packetization system is provided that operates to packetize multiplexed content flows into a transmission frame for transmission over a data network. For example, the multiplexed content flows comprise a particular arrangement, sequence, mixing, and/or selection of real-time and/or non real-time services for transmission to a device. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data network.

For the purpose of this description, one or more embodiments of a packetization system are described herein with reference to a communication network that utilizes Orthogonal Frequency Division Multiplexing (OFDM) to provide communications between a network server and one or more mobile devices. For example, in an embodiment of an OFDM system, a superframe is defined that comprises time division multiplex (TDM) pilot signals, frequency division multiplex (FDM) pilot signals, overhead information symbols (OIS), and data symbols. A data slot is defined that comprises a set of five hundred data symbols that occur over one OFDM symbol time. Additionally, an OFDM symbol time in the superframe carries seven data slots.

The following definitions are used herein to describe one or more embodiments of a packetization system.

Flow An element of a service, for example, a service may have two flows—an audio flow and a video flow.

Service A media content that can have one or more flows.

MLC A media logical channel ("channel") used for data or control information.

Overhead Information Symbols (OIS)

Symbols in a superframe that carry information about the location of various MLCs in the superframe.

Slot The smallest unit of bandwidth allocated to a MLC over an OFDM symbol.

Figure 1:
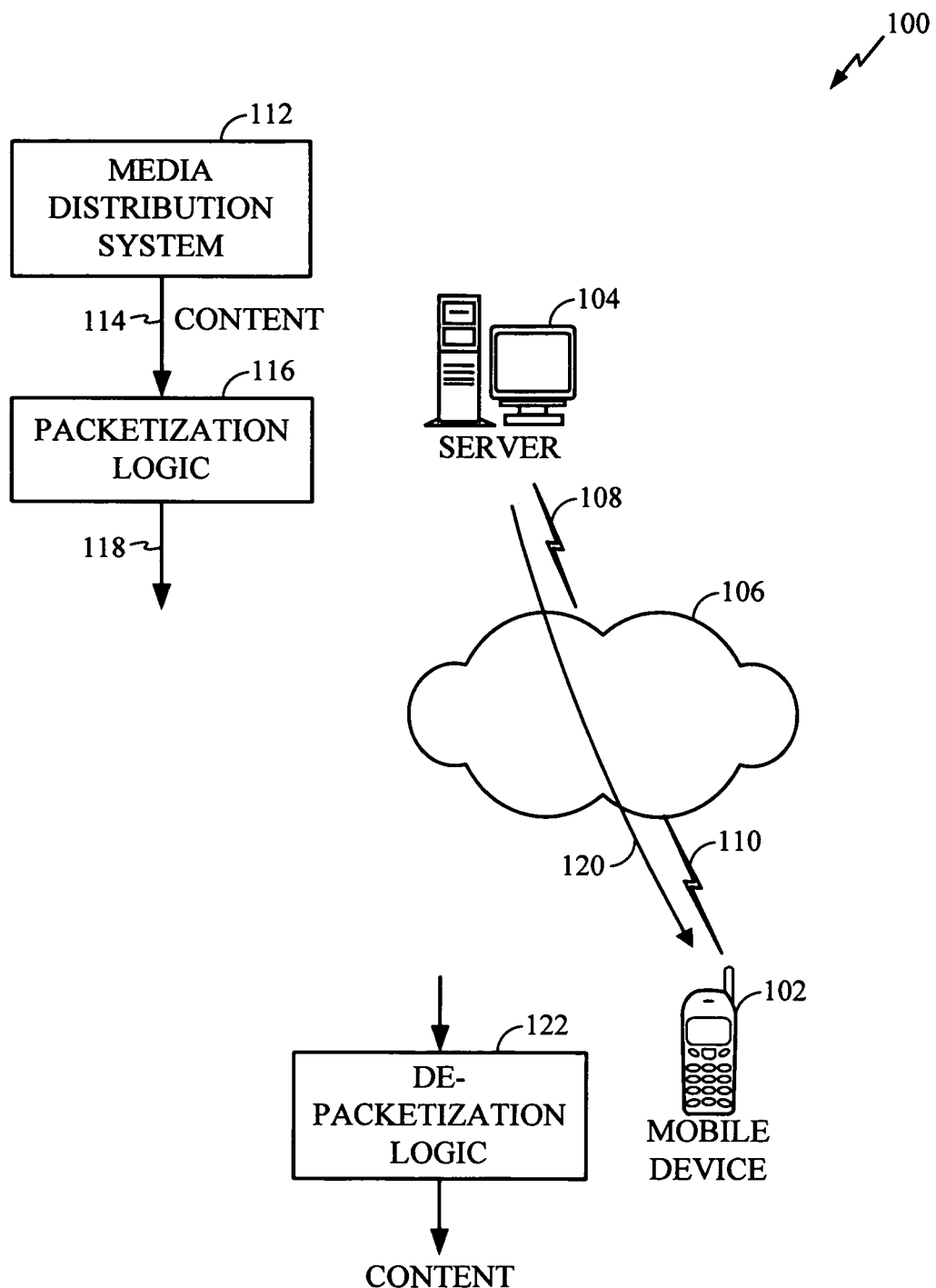
FIG. 1 shows a network that comprises an embodiment of a packetization system.

FIG. 1 shows a network 100 that comprises an embodiment of a packetization system. The network 100 comprises a mobile device 102, a server 104, and a distribution network 106. For the purpose of this description, it will be assumed that the network 106 operates to communicate with one or more portable devices using OFDM technology; however, embodiments of the packetization system are suitable for use with other transmission technologies as well.

In an embodiment, the server 104 operates to provide services that may be subscribed to by devices in communication with the network 106. The server 104 is coupled to the network 106 through the communication link 108. The communication link 108 comprises any suitable communication link, such as a wired and/or wireless link that operates to allow the server 104 to communicate with the network 106. The network 106 comprises any combination of wired and/or wireless networks that allows services to be delivered from the server 104 to devices in communication with the network 106, such as the device 102. In an embodiment, the network 106 provides unicast, multicast, broadcast or any other type of communication channels that may be used by the server 104 to deliver information to one or more devices.

It should be noted that the network 106 may provide communications with any number and/or types of portable devices within the scope of the embodiments. For example, other devices suitable for use in embodiments of the packetization system include, but are not limited to, a personal digital assistant (PDA), email device, pager, a notebook computer, mp3 player, video player, or a desktop computer. The wireless link 110 comprises a wireless communication link based on OFDM technology; however, in other embodiments the wireless link may comprise any suitable wireless technology that operates to allow devices to communicate with the network 106.

The device 102 in this embodiment comprises a mobile telephone that communicates with the network 106 through the wireless link 110. The device 102 takes part in an activation process that allows the device 102 to subscribe to receive services over the network 106. In an embodiment, the activation process may be performed with the server 104; however, the activation process may also be performed with another server, service provider, content retailer, or other network entity. For the purpose of this description, it will be assumed that the device 102 performs the activation process with the server 104 and is now ready to subscribe and receive services from the server 104.

In an embodiment, the server 104 is part of or communicates with a media distribution system 112. For example, the distribution system 112 may comprises other entities, such as real time media servers (RTMS), non real time media server (NRTMS), distribution servers, content providers, and/or any other type of distribution system entity. The media distribution system 112 operates to provide content 114 for distribution to devices on the distribution network 106. For example, the content comprises multimedia content that includes news, sports, weather, financial information, movies, and/or applications, programs, scripts, or any other type of suitable content or service.

The server 104 also comprises packetization logic 116 that operates to efficiently packetize the content 114 into packets 118 for distribution over the network 106. For example, the packets 118 are transmitted over the network 106 to the device 102, as shown by the path 120. In an embodiment, the packetization logic 116 operates to generate Sync Headers, Framing Headers, and associated presentation time stamps (PTS) that are included with the packets 118 so that a receiving device is able to synchronize how received content is rendered on the device and errors are processed. A more detailed description of the packetization logic 116 is provided in another section of this document. As a result of the operation of the packetization logic 116, the content is optimally packetized and time stamped, thereby efficiently utilizing the network bandwidth and providing a way to synchronize the content at a receiving device.

In an embodiment, the device 102 comprises de-packetization logic 122 that operates to reverse the process or packetization performed at the server 104. Because the packetization logic 116 has packetized the content to include presentation time stamps, the de-packetization logic 122 is able to synchronize the content and render it at the device 102.

Therefore, embodiments of the packetization system operate to perform one or more of the following functions to provide efficient distribution and synchronization of content over a distribution network.
1. Receive or gain access to content comprising real time and/or non real time services.
2. Packetize the content so that the packets include presentation time stamps.
3. Distribute the packetized content over a distribution network.
4. De-packetize the content at a receiving device.
5. Use the presentation time stamps to provide synchronized rendering of the content.

Therefore, in one or more embodiments, a packetization system operates to efficiently packetize and transmit content to devices on a data network. It should be noted that the packetization system is not limited to the implementations described with reference to FIG. 1, and that other implementations are possible within the scope of the embodiments.

System Overview and Features

A packetization system is provided that efficiently distributes packetized content over wireless networks. In an embodiment, a Forward Link Optimized (FLO™) multicast network is used to deliver multimedia content. Based on Orthogonal Frequency Division Multiplexing (OFDM) technology, the FLO multicast network is designed to efficiently deliver broadband multimedia to large numbers of subscribers.

The system provides a broadband, wireless multicast delivery service to mobile users on a subscription basis. The individual multicast content channels are referred to as services. There are three fundamental types of services supported by the system as follows.
1. Non-real-time Service: A file distribution service for delivery of, for example, media clips—also referred to as a Clipcast service type.
2. Real-time streaming service type
3. IP datacast service type Non-Real-Time Service The system delivers files (e.g., media clips) as a non-real-time service (also referred to as a Clipcast Service). The files may comprise audio, audio and video, and/or other types of data. Once the user has subscribed to the service, the content is delivered to the user's mobile device in the background, transparent to the user. The media is stored on the device and may be accessed by the user during a scheduled availability period.

Real-Time Service

The second fundamental service type delivered is real-time service in which content is streamed to the devices in real-time. The end-user can "tune-in" to a real-time service at any time and receive current content. As with non-real-time services, the user will typically need to subscribe to the real-time service before gaining access.

IP Datacast Service

The IP Datacast service is a wireless IP multicast service to support a wide range of applications. This service type allows a system operator and/or third-parties to multicast content using Internet Engineering Task Force (IETF) protocols over the distribution network. The distribution network provides a range of Qualities of Service (QoS) for delivering IP multicast streams in terms of loss rate and delay jitter. Like the other service types, IP Datacast services may be offered on a subscription basis.

Figure 2:
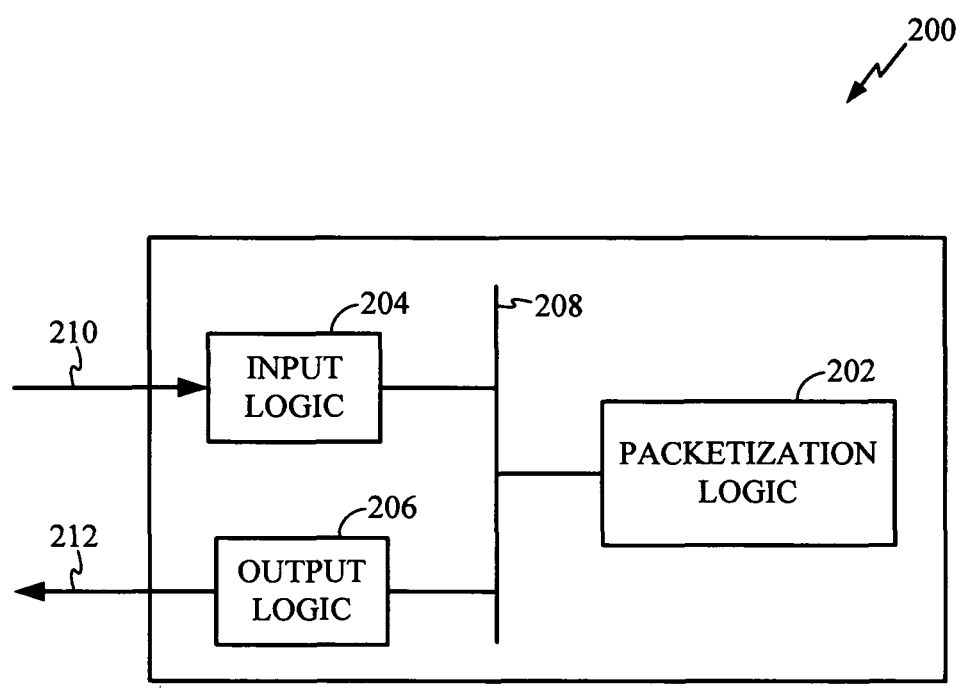
FIG. 2 shows an embodiment of a server suitable for use in a packetization system.

FIG. 2 shows an embodiment of a server 200 suitable for use in a packetization system. For example, the server 200 may be used as the server 104 in FIG. 1. The server 200 comprises packetization logic 202, input logic 204, and output logic 206, all coupled to a data bus 208. It should be noted that the server 200 represents just one implementation and that other implementations are possible within the scope of the embodiments. For example, the server 200 may comprise at least one processor configured to execute one or more program instructions to provide the functions of the packetization system described herein.

In one or more embodiments, the packetization logic 202 comprises a CPU, processor, gate array, hardware logic, memory elements, virtual machine, software, and/or any combination of hardware and software. Thus, the packetization logic 202 generally comprises logic to execute machine-readable instructions and to control one or more other functional elements of the server 200 via the data bus 208.

The input logic 204 comprises hardware and/or software that operate to allow the server 200 to receive content and/or other information from distribution system entities through communication channel 210. For example, in an embodiment, the communication channel 210 comprises any suitable type of communication link to allow the server 200 to communicate directly with other servers or with one or more data networks and/or devices coupled to those data networks. Thus, the input logic 204 allows the server 200 to receive content for distribution over a distribution network.

The output logic 206 comprises hardware and/or software that operate to allow the server 200 to output packetized content and/or other information to a distribution network for distribution to one or more devices through communication channel 212. For example, in an embodiment, the communication channel 212 comprises any suitable type of communication link to allow the server 200 to communicate directly with a distribution network and/or devices coupled to that network. For example, the communication channel 212 provides a unicast, multicast, broadcast, or any other type of communication channel that allows the server 200 to deliver packetized content for distribution over a distribution network.

During operation of an embodiment, content is received at the input logic 204 through input channel 210. The packetization logic 202 operates to provide protocol layers through which the received content is packetized for transmission over a distribution network. In one embodiment, packetization logic 202 operates to provide one or more protocol layers that are used to incorporate Sync Headers, Frame Headers, presentation time stamps, and checksums into the content. The protocol layers also operate to fragment the content into blocks for transmission over a distribution network using the output logic 206 and communication channel 212. A more detailed description of the packetization logic 202 and the functions performed by protocol layers is provided in other sections of this document.

In an embodiment, the packetization system comprises a computer program having one or more program instructions ("instructions") stored on a computer-readable medium, which when executed by at least one processor, for instance, the packetization logic 202, provides the functions of the packetization system described herein. For example, instructions may be loaded into the server 200 from a computer-readable media, such as a floppy disk, CDROM, memory card, FLASH memory device, RAM, ROM, or any other type of memory device or computer-readable medium that interfaces to the server 200. In another embodiment, the instructions may be downloaded into the server 200 from an external device or network resource that interfaces to the server 200. The instructions, when executed by the packetization logic 202, provide one or more embodiments of a packetization system as described herein.

Thus, the server 200 operates to provide embodiments of a packetization system to efficiently packetize multiplexed content flows for distribution over a distribution network.

Figure 3:
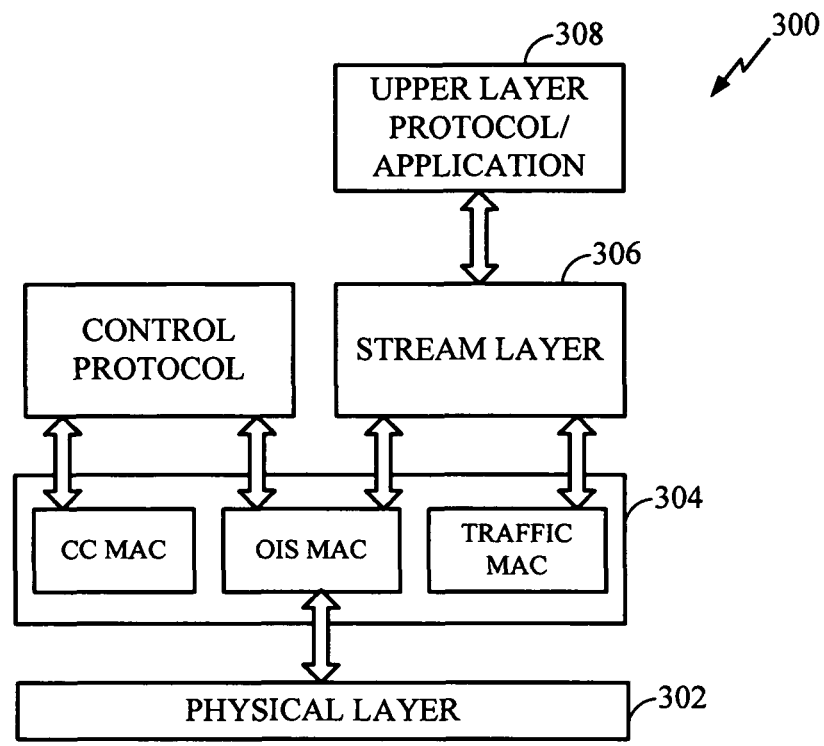
FIG. 3 shows an embodiment of layers and protocols for use in a packetization system.

FIG. 3 shows an embodiment of layers and protocols 300 for use in a packetization system. For example, in an embodiment, the packetization logic 202 shown in FIG. 2 operates to provide the layers and protocols 300 shown in FIG. 3. The lowest layer is the FLO Physical layer 302. This layer operates to format and process FLO waveforms for efficient delivery of multicast content over a distribution network. The layer above the Physical layer 302 is the Medium Access Control (MAC) layer 304. The key function of the MAC layer 304 is the allocation of FLO Physical Layer resources to upper layer streams. The MAC layer 304 also multiplexes the Media Logical Channels (MLCs) onto the Physical layer 302. The upper layers 308 use the services of the Stream layer 306 to deliver data to devices.

Figure 4:
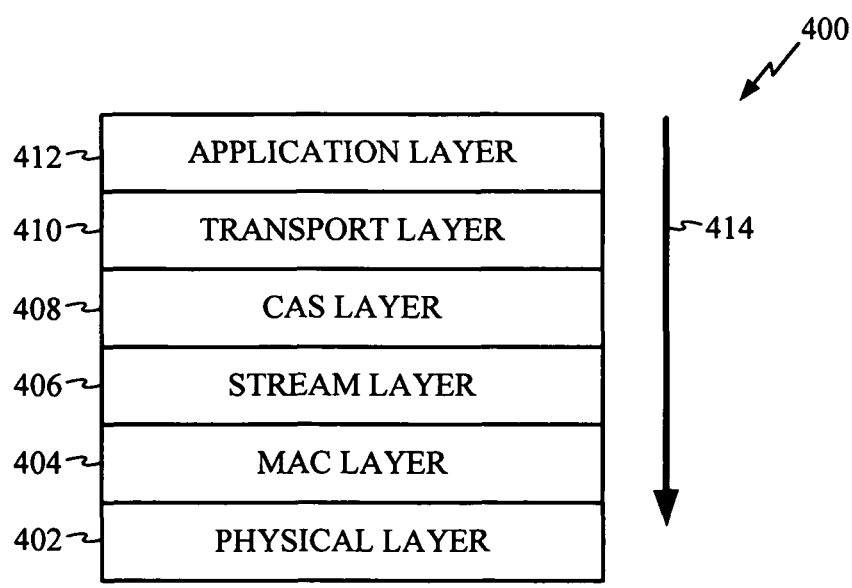
FIG. 4 shows an embodiment of protocol architecture for use in a packetization system.

FIG. 4 shows an embodiment of protocol architecture 400 for use in a packetization system. For example, in an embodiment, the packetization logic 202 shown in FIG. 2 operates to provide the protocol architecture 400 shown in FIG. 4. On the server side, the flow of content through the protocol architecture 400 is shown by the direction arrow 414. On the device side, the flow of content through the protocol architecture 400 is in the opposite direction. The Physical 402, MAC 404, and Stream 406 layers operate as described above with reference to FIG. 3. The Conditional Access Service (CAS) 408, Transport 410, and Application 412 layer protocols and messages operate as follows.

The CAS layer 408 implements encryption and decryption of content. The CAS layer 408 is optional for each service. For each service that implements content encryption, the server generates a service key. In an embodiment, the service key is delivered to the device over a unicast connection. The CAS layer 408 is implemented for flows of these services, and the server generates a working key for these flows. This working key is used to encrypt the data being sent over the flow. The working key is then encrypted using the service key and delivered to the device. Using the service key, the device can recover the working key. The device can recover the flow data using the working key.

The Transport layer 410 provides packet service over the Stream layer 406. The Stream layer 406 is described in detail in another section of this document. The upper layers of the architecture 400 deliver a sequence of octets to the Stream layer 406 and the Stream layer 406 delivers these octets (with possible errors) to the device. However, typical applications need a packet-based service. A key function of the Transport layer 410 is to provide this packet service over the Stream layer 406. In addition, the Transport layer 410 also has an optional Checksum protocol to verify data integrity. A more detailed discussion of the transport layer is provided in another section of this document.

The Application Layer 412 is where the multimedia content is generated at the server side and consumed at the device side. In an embodiment, the Application layer 412 comprises a real time Content sub-layer and a Sync sub-layer used for achieving synchronization between video and audio flows. A more detailed description of Application layer 412 and its sub-layers is provided below.

Application Layer Sub-Layers

Figure 5:
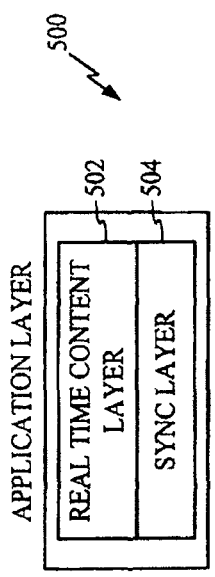
FIG. 5 shows how an Application layer is divided into a real-time Content layer and a Sync layer.

FIG. 5 shows how an Application layer 500 is divided into two sub-layers: namely, a real-time Content layer 502 and a Sync layer 504.

Real-Time Content Layer

The real-time Content layer 502 is the layer that generates/consumes real-time content. This content can be video, audio, text, closed captioning etc. Each type of content is encoded and formatted appropriately. For example, in an embodiment, video is formatted using an industry standard H.264 format and audio is formatted according to an industry standard AAC+ format.

Sync Layer

The Sync Layer 504 operates to process Content layer packets from the real time Content layer 502 to produce Sync layer packets. The Sync layer 504 operates to process the Content layer packets to include the following information.

1. Time stamp and media frame number information.
2. Information about Random Access Points (RAP) in the continuous stream of data. This supports acquisition of audio and video streams.
3. Information needed for audio/video decoding that is not carried in the raw bit stream or information that assists with video/audio decoding. For example, Base or enhancement flags, identifiers for reference/non-reference frames, and Stream identifiers.
4. In addition, on the receiving device side, the Sync layer fields allow the device to determine missing/erroneous media frames and to perform appropriate error handling.

The Sync layer 504 uses the Transport layer 404 to deliver packets from the server to devices.

Figure 6:
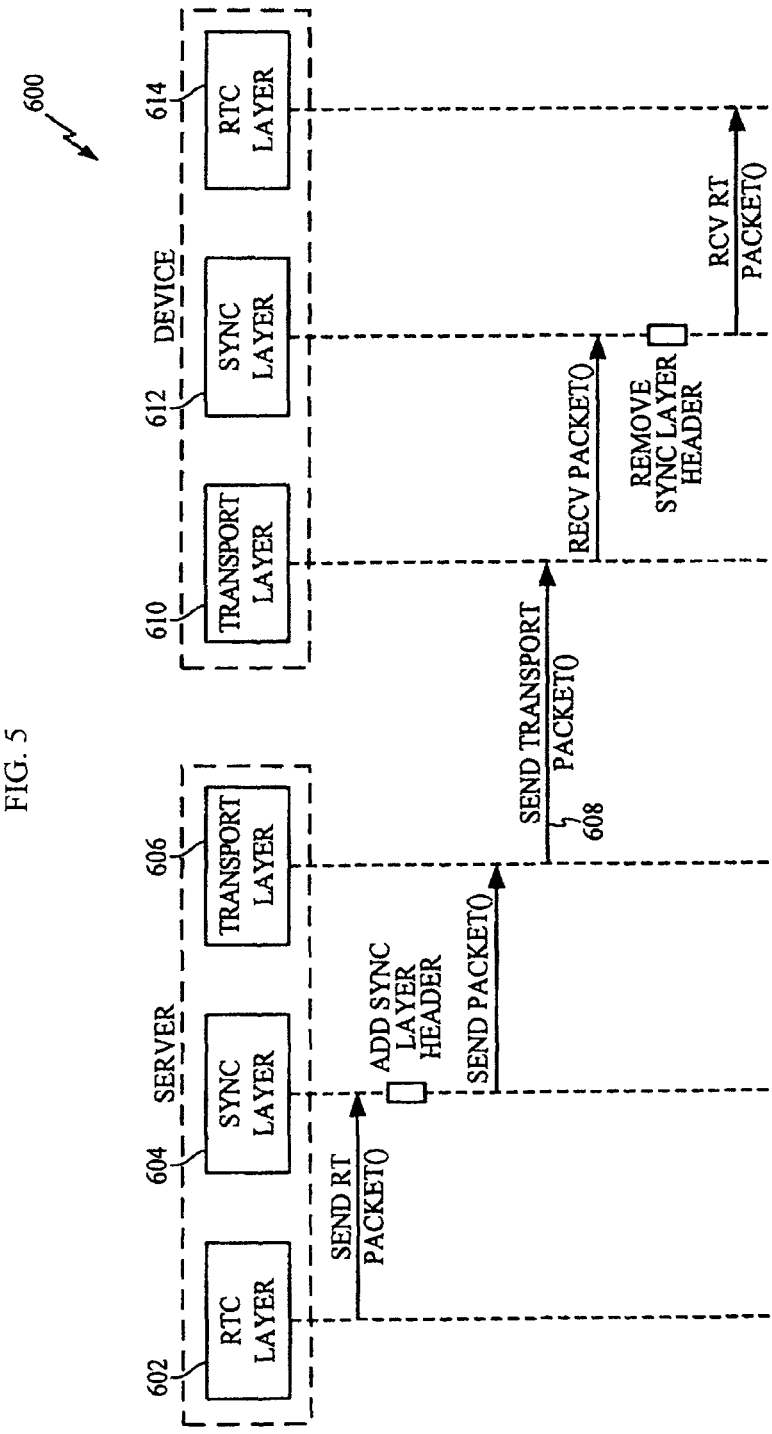
FIG. 6 shows a flow diagram that illustrates the data flow between layers in an embodiment of a packetization system.

FIG. 6 shows a flow diagram 600 that illustrates the data flow between layers in an embodiment of a packetization system. The real-time Content layer 602 on the server sends packets to the Sync layer 604. The Sync layer 604 adds a Sync layer header and presentation time stamps to the packets and sends them to the Transport layer 606. The Transport layer 606 fragments the packets into blocks and sends them over the network 608.

A device that is "tuned" to the real-time service receives these packets at the Transport layer 610. The Transport layer 610 delivers packets to the Sync layer 612. The Sync layer 612 removes the Sync layer header and delivers the packets to the real-time Content layer 614 to be decoded and rendered at the presentation time using a media player at the device.

Sync Layer Header Specification

Figure 7:
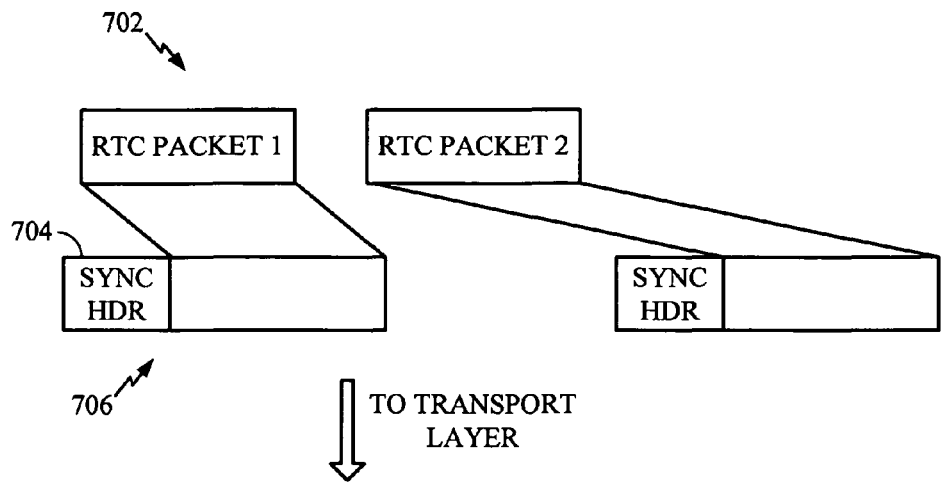
FIG. 7 illustrates how a Sync layer adds a Sync layer header to real-time Content layer packets.

FIG. 7 illustrates how the Sync layer adds a Sync layer header to each real-time Content layer packet. For example, Content layer packets 702 receive a Sync layer header 704 to form sync layer packets 706. The format of the Sync Layer Header is shown in Table 1 as follows.

TABLE 1

| Field Name | Field Type |
| --- | --- |
| MEDIA_TYPE | UINT(2) |
| PTS | UINT(14) |
| FRAME_ID | FRAME_ID_TYPE (7 bits) |
| RAP_FLAG | BIT(1) |
| FRAME_RATE | UINT(3) |
| RESERVED | UINT(5) |

The following is a description of the fields provided in the Sync layer header. It should be noted that the fields provided in Table 1 represent just one implementation and that the deletion, modification, or addition of fields are possible within the scope of the embodiments.

MEDIA_TYPE

The MEDIA_TYPE field identifies the type of media to which the Sync layer packet belongs. This information is useful in routing messages to the appropriate media decoder within a receiving device. The values for the MEDIA_TYPE field are listed in Table 2 as follows.

TABLE 2

| Name | Value |
| --- | --- |
| VIDEO | 00 |
| AUDIO | 01 |
| TIMED_TEXT | 10 |

The value 11 is reserved.

Presentation Time Stamp (PTS)

The PTS field provides a presentation time for the real-time Content packet (or media frame). This field is specified in units of milliseconds. The PTS field is added to the superframe time (obtained from the OIS) to get the actual time at which the packet is to be presented.

FRAME_ID

The FRAME_ID field uniquely identifies each media frame within a superframe. The values for the FRAME_ID field are listed in Table 3 as follows.

TABLE 3

| Field Name | Field Type |
| --- | --- |
| FRAME_NUMBER | UINT(6) |
| ENHANCEMENT_FLAG | BIT(1) |

FRAME_NUMBER

The FRAME_NUMBER is the number of the current media frame within the superframe.

ENHANCEMENT_FLAG

The ENHANCEMENT_FLAG is a bit that indicates whether the current media frame is for the Base or Enhancement layer. If the current media frame is for the Base layer, then the ENHANCEMENT_FLAG is set to 0. If the current media frame is for the Enhancement layer, then the ENHANCEMENT_FLAG is set to 1. If the MEDIA_TYPE is set to '01' (AUDIO), then the ENHANCEMENT_FLAG is set to 0. If the MEDIA_TYPE is set to '10' (TIMED_TEXT), then the ENHANCEMENT_FLAG is set to 0.

RAP_FLAG

The RAP_FLAG signals whether the current media frame is a random access point. This is used during reacquisition or channel switching at a receiving device. If the current media frame is a random access point, then the RAP_FLAG bit is set to 1.

FRAME_RATE

The FRAME_RATE field represents the rate at which media frames are being generated by the transcoder. The values for the FRAME_RATE field are listed in Table 4 below. However is should be noted that the FRAME_RATE values are not limited to those shown in Table 4 and that other frame rate values are possible within the scope of the embodiments.

TABLE 4

| Frame Rate (frames per second) | Value |
| --- | --- |
| 24000/1001 (23.976) | 000 |
| 24 | 001 |
| 25 | 010 |
| 30000/1001 (29.97) | 011 |
| 30 | 100 |
| 50 | 101 |
| 60000/1001 (59.94) | 110 |
| 60 | 111 |

In an embodiment, the FRAME_RATE field is included if the MEDIA_TYPE field is set to '00' (VIDEO). The media frame rate is the resulting rate in frames per second when both the Base and Enhancement layers data are completely decoded.

RESERVED

The RESERVED bits (5-bits) are utilized to byte align the Sync layer header. The RESERVED bits are included if the MEDIA_TYPE field is set to '00' (VIDEO). If included, all the RESERVED bits are set to 0. Thus, For audio frames, the size of the Sync layer header is 3 bytes. For video frames, the size of the Sync layer header is 4 bytes.

In an embodiment, a modification to the Sync layer header uses one-bit of the 5 reserved bits for a reference flag (REFERENCE_FLAG). With this modification, the format of the Sync Layer Header is shown in Table 5 as follows.

TABLE 5

| Field Name | Field Type |
| --- | --- |
| MEDIA_TYPE | UINT(2) |
| PTS | UINT(14) |
| FRAME_ID | FRAME_ID_TYPE (7 bits) |
| RAP_FLAG | BIT(1) |
| FRAME_RATE | UINT(3) |
| REFERENCE_FLAG | UINT(1) |
| RESERVED | UINT(4) |

REFERENCE FLAG

The REFERENCE_FLAG signals whether the current media frame is a reference frame or not. This is used during reacquisition or channel switching or trick play mode at a receiving device. For example, the non-reference frames can be skipped during decoding for various reasons such as in fast forward or in throttling decode complexity in low power and/or low end devices with limited display or power capabilities.

Due to the addition of the REFERENCE_FLAG bit, the RESERVED bits are now reduced to 4 as illustrated in Table 5.

Sync Layer Directories

It is desirable that real time services be resilient to errors. To improve a device's ability to tolerate errors, audio and video Sync layer directories are sent to the receiving device.

It should be noted that the Sync layer directories are optional. When utilized they may be transmitted as associated signaling messages. The frequency of transmitting the Sync layer directories can also be adapted to the nature of errors in the communication system. The audio and video Sync layer directory formats are different and they are described below.

Audio Sync Layer Directory

The format of the audio Sync layer directory is shown in Table 6 as follows.

TABLE 6

| Field Name | Field Type |
| --- | --- |
| MESSAGE_ID | UINT(8) |
| MEDIA_TYPE | UINT(2) |
| FLOW_ID | UINT(20) |
| NUM_FRAMES | UINT(5) |
| FIRST_FRAME_PTS | UINT(14) |
| LAST_FRAME_PTS | UINT(14) |
| RAP_FLAG_BITS | NUM_FRAMES*BIT(1) |
| RESERVED | BIT(1 ... 7) |

The following is a description of the fields provided in the audio Sync layer directory. It should be noted that the fields provided in Table 6 represent just one implementation and that the deletion, modification, or addition of fields are possible within the scope of the embodiments.

MESSAGE_ID

The MESSAGE_ID field identifies the type of message to be sent. In an embodiment, the value of the MESSAGE_ID field is set to AUDIO_SYNC_DIRECTORY (4).

MEDIA_TYPE

The MEDIA_TYPE field identifies the stream type for which the audio Sync layer directory is being sent. The MEDIA_TYPE field to '01' (AUDIO) for the audio Sync layer directory message.

FLOW_ID

The FLOW_ID identifies the flow for which the audio Sync layer directory is being sent. One MLC can support up to two audio flows. Therefore, the Stream 0 of that MLC can carry two Sync layer directory structures. The FLOW_ID field identifies the flow whose Sync layer directory information is being addressed. The audio Sync layer directory message is specific to the flow specified by FLOW_ID. Since the message is associated with the flow, this message only needs to be sent on the Stream 0 of the MLC that supports the flow. Thus, the Audio Sync layer directory message is sent on the Stream 0 associated with the flow specified by FLOW_ID.

NUM_FRAMES

The NUM_FRAMES field is the number of audio frames present in the superframe.

FIRST_FRAME_PTS

The FIRST_FRAME_PTS is the PTS of the first audio frame in the superframe.

LAST_FRAME_PTS

The LAST_FRAME_PTS is the PTS of the last audio frame in the superframe. Thus, a receiving device knows the rate of audio frames, and, based on these two time stamps, it can interpolate all the PTS values of the current superframe.

RAP_FLAG_BITS

The RAP_FLAG_BITS are used to indicate whether a particular audio frame is a random access point. Therefore, there are NUM_FRAMES bits in the message. The LSB corresponds to the first audio frame and the MSB corresponds to the last audio frame. A bit is set to 1 if the corresponding audio frame is a random access point.

RESERVED

The RESERVED bits are added to byte align the message. The RESERVED bits of the Audio Sync layer directory message are set to 0.

Video Sync Layer Directory

The format of the video Sync layer directory is shown in Table 7 as follows.

TABLE 7

| Field Name | Field Type |
| --- | --- |
| MESSAGE_ID | UINT(8) |
| MEDIA_TYPE | UINT(2) |
| NUM_VSL_RECORDS | UINT(1) |
| VSL_RECORDs | VSL_RECORD_TYPE |
| RAP_FLAG_BITS | BIT(60) |
| B_FRAME_FLAG_BITS | BIT(60) |
| RESERVED | BIT(3) |

The following is a description of the fields provided in the video Sync layer directory. It should be noted that the fields provided in Table 7 represent just one implementation and that the deletion, modification, or addition of fields are possible within the scope of the embodiments.

MESSAGE_ID

The MESSAGE_ID field identifies the type of message being sent over Stream 0. The value of the MESSAGE_ID field of the video Sync directory message is set to VIDEO_SYNC_DIRECTORY (5).

MEDIA_TYPE

The MEDIA_TYPE field identifies the stream for which the video Sync layer directory information is being sent. The MEDIA_TYPE field is set to '00' for video Sync layer directory messages.

NUM_VSL_RECORDS

The number of VSL_RECORDs present in the message is NUM_VSL_RECORDS+1. In an embodiment, 2 VSL_RECORDS can be sent in a video Sync Layer Directory message.

In another embodiment, NUM_VSL_RECORDS signals whether the current VSL record is the last VSL record or not. When NUM_VSL_RECORDS=0, this indicates that there are more VSL records that follow. When NUM_VSL_RECORDS=1, this indicates that the current record is the last of the VSL records carried in the video sync directory.

VSL_RECORD

One VSL_RECORD is sent in the message for each frame rate used within a superframe. The format of the VSL_RECORD is specified in Table 8 as follows.

TABLE 8

| Field Name | Field Type |
| --- | --- |
| FRAME_RATE | UINT(3) |
| NUM_FRAMES | UINT(6) |
| FIRST_FRAME_PTS | UINT(14) |
| LAST_FRAME_PTS | UINT(14) |

FRAME_RATE

The FRAME_RATE field provides frame rate information. Table 4 specifies the values for the FRAME_RATE field. Video frames can be sent at multiple frame rates within a superframe. These frame rate values are specified in the VSL_RECORDS.

NUM_FRAMES

The NUM_FRAMES field indicates the number of frames at the frame rate specified by the FRAME_RATE field.

FIRST_FRAME_PTS

The FIRST_FRAME_PTS is the PTS of the first video frame of the block of frames at the frame rate specified by FRAME_RATE.

LAST_FRAME_PTS

The LAST_FRAME_PTS is the PTS of the last video frame of the block of frames at the frame rate specified by FRAME_RATE.

RAP_FLAG_BITS

The video Sync directory message contains 60 RAP_FLAG_BITS corresponding to a maximum of 60 video frames in a superframe. The length of the bit pattern for RAP_FLAG_BITS corresponds to the largest frame rate specified in the FPS field. A RAP bit of the Video Sync layer directory message is set to 1 if the corresponding video frame is a random access point. Otherwise, the bit is set to 0. The LSB corresponds to the first video frame and the MSB corresponds to the last video frame.

B_FRAME_FLAG_BITS

The video Sync directory message contains 60 B_FRAME_FLAG_BITS corresponding to a maximum of 60 video frames in a superframe. The length of the bit pattern for RAP_FLAG_BITS corresponds to the largest frame rate specified in the FPS field. The B_FRAME_FLAG_BIT of the Video Sync layer directory message is set to 1 if the corresponding video frame is a b-frame. Otherwise, the bit is set to 0. The LSB corresponds to the first video frame and the MSB corresponds to the last video frame.

RESERVED

The RESERVED bits are used to byte align the video Sync layer directory message. The 3 RESERVED bits of the video Sync layer directory message are included when the NUM_VSL_RECORDS field is set 1. If included, the RESERVED bits in the video Sync layer directory message are set to 0. The video Sync layer directory message is specific to the video flow. Since the message is associated with the flow, this message is sent on the Stream 0 of the MLC that supports the flow. Thus, the video Sync layer directory message is sent on the Stream 0 associated with the flow on which video data is sent.

Transport Layer Protocols

Many of the services provided by the distribution system require the delivery of "packets" from the server to the device. For example, for real-time video, the server sends multiple video frames in every superframe. These video frames can be of different sizes. Therefore, it is desirable to have a way to efficiently pack these upper layer packets into a stream. A mechanism is also needed to determine the boundaries of these packets in the presence of errors. These functions are provided by the Transport layer, which is described in the following sections.

Lower Layer Operation

To better understand the operation of the Transport layer, a brief description of the operation of the lower layers (i.e., Stream, MAC, and Physical layers) is provided.

Figure 8:
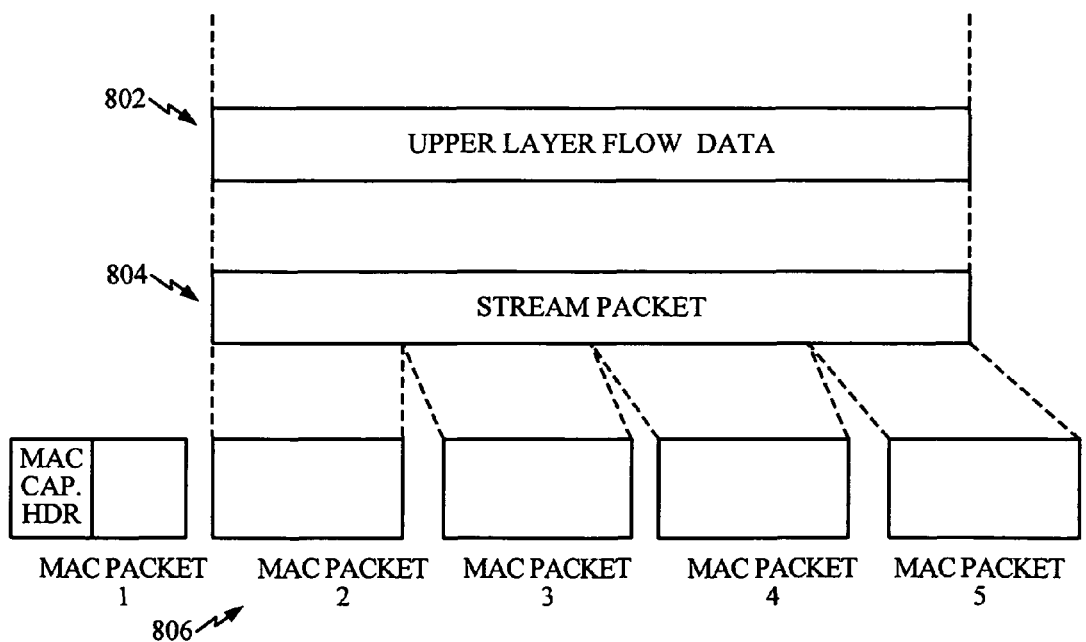
FIG. 8 shows a diagram that illustrates the operation of the Stream, MAC, and Physical layers in a packetization system.

FIG. 8 shows a diagram that illustrates the operation of the Stream, MAC, and Physical layers in a packetization system. In an embodiment, the upper layer protocols use the services of the Stream layer. A major function of the Stream layer is to multiplex data of flows onto MLCs. On the server side, the upper layers 802 deliver a sequence of bytes belonging to a flow to the Stream layer 804. The Stream layer 804 sends this sequence of bytes to the MAC layer 806. The MAC layer 806 breaks up the sequence of bytes into MAC layer packets. There is a one to one correspondence between a MAC layer packet and a Physical layer packet. For example, Physical layer packets (PLPs) are 122 bytes long. These PLPs are sent to a device over the Physical layer.

Framing and Checksum Protocols

In an embodiment, the Transport layer comprises a Framing protocol and a Checksum protocol. The protocols of the Transport layer operate to provide one or more of the following functions.

1. Provide a "packet" interface to the Application layer: On the server side, the Framing protocol fragments an Application layer packet (or simply, packet) into smaller blocks that are sent over the Stream layer. When these Stream layer blocks (or simply, blocks) are received by a device, the Framing protocol specifies rules for combining them to create packets to be delivered to the upper layers at the receiving device.
2. Handling Stream layer block errors at the device: When the lower layers deliver data to the Transport layer, the Checksum protocol adds error indications if blocks are suspected to be in error. The Framing protocol specifies rules for handling block errors and the resulting behavior that can be expected by the upper layers.
3. Provide an interface to the lower layers including the CAS, Stream, MAC, and Physical layers.

Packet Fragmentation

On the server, the upper layer (i.e., Application layer) commands the Transport or Framing layer to send data over a particular flow. The command contains the following parameters.

1. The flow ID on which the data is to be sent.
2. The number of packets to be sent.
3. For each packet, the upper layer sends its length and along with its contents.

In each superframe, the MAC layer determines the maximum number of MAC layer packets that can be sent for each MLC in the system or the number of MAC layer packets to be sent for each MLC corresponding to the service (by means of for example a scheduling algorithm). These MAC layer packets correspond to the 122 byte PLPs. The Stream layer uses this information to determine the maximum number of Stream layer blocks that can be sent for each flow of an MLC. Each Stream layer block corresponds to a MAC layer packet and is also 122 bytes long. The Stream layer sends an indication to the Transport layer regarding the maximum number of Stream layer blocks allowed to be sent in that superframe. Based on this information, the Framing protocol of the Transport layer operates to fragment the Application layer packets into blocks and send them over the Stream corresponding to the requested flow.

FIG. 9 shows a fragmentation scheme for a single packet provided by an embodiment of the Framing protocol. For example, the packet 902 received from the upper layers (i.e., Sync layer) has a size of 484 bytes. In an embodiment, the packet 902 is fragmented into four fragments 904 of 121 bytes each. A one-byte Framing Header (FH) is added to each fragment and each fragment is sent as a 122 byte Stream layer block to the Stream layer.

FIG. 10 illustrates how an embodiment of a Framing protocol operates to fragment two packets. The first packet is 200 bytes long and the second packet is 283 bytes long. The first packet is fragmented into two parts. The first fragment is 121 bytes long and a 1 byte header is added to create a 122 byte Block 1002. The second fragment is 79 bytes long. A 1 byte header is added to use up 80 bytes out of the available 122 bytes of the second Stream layer Block 1004. A fragment of size 41 bytes is taken from the second packet and 1 byte header is added to this fragment to generate 42 bytes of data. The 80 bytes of the first packet and the 42 bytes of the second packet are concatenated to form the 122 bytes of the second Block 1004. The remaining 242 bytes of the second packet are fragmented into two fragments of 121 bytes each. As before, a 1 byte header is added to each of these fragments to form 122 byte Blocks (1006 and 1008).

FIG. 11 illustrates how an embodiment of a Framing protocol operates to fragment an upper layer packet of size 200 bytes into two parts. The first part is 121 bytes long and the second is 79 bytes long. A 1 byte frame header is added to the first fragment to produce a 122 byte Block 1102. Another 1 byte header is added to the second fragment. In addition, another 1 byte flag field and 41 padding bytes are added to create the second block 1104.

As described previously, a 1 byte Frame Header is added before every fragment. The format of the 1 byte frame header is described in the following sections.

Frame Header Format

The format of the Frame Header is specified in Table 9 as follows.

TABLE 9

| Field Name | Field Type |
|---|---|
| LENGTH | UINT(7) |
| LAST | BIT(1) |

LENGTH

This field indicates the number of bytes of the upper layer packet present in a fragment. The range for the LENGTH field is 0 through 121 inclusive, (i.e., 7A and 7F hex). Other values are reserved.

LAST

The LAST bit indicates whether the current fragment is the last fragment of an upper layer packet. The LAST bit is set to 1 to indicate that the current fragment is the last fragment belonging to a packet. The LAST bit is set 0 if the current fragment is not the last fragment belonging to a packet.

Referring again to FIG. 9, the first byte in each of the three blocks are the Frame Headers. These Frame Headers will have the LENGTH field set to 121 and the LAST bit set to 0. The first byte of the fourth block is also a Frame Header whose LENGTH field is set to 121 and the LAST bit set to 1.

Referring again to FIG. 10, the first byte of the blocks 1 and 3 are Frame Headers with LENGTH field set to 121 and the LAST bit set to 0. The first byte of block 4 is also a Frame Header with LENGTH field set to 121 and the LAST bit set to 1. The first byte of block 2 is a Frame Header with LENGTH field set to 79 and the LAST bit set to 1. This indicates that a second frame header is present in the block at an offset of 80 bytes (79 bytes for the fragment plus one byte for the Frame Header). This Frame Header will have the LENGTH field set to 41 and the LAST bit set to 0.

Last Packet Indication

Referring again to FIG. 11, the 200 byte packet was fragmented into a 121 byte fragment and a 79 byte fragment. Adding the Frame Header to the second fragment uses 80 bytes out of the 122 bytes of the block. Another 1 byte frame header and 41 bytes of padding is added to fill out the second block.

The LAST bit is set to 1 and the LENGTH field is set to 127 (7F hex) to indicate that the rest of the bytes in a block are pad bytes. The pad bytes of a block are set to a value of 0. If the LAST bit is set to 0, the range of values for the LENGTH field is 1 through 121.

LENGTH=0 Condition

Assuming that the Application layer has two packets to be sent on a particular flow, and that the size of the first packet is 120 bytes and the size of the second packet is 100 bytes. When the first packet is fragmented, the server adds a one byte Frame Header and puts the 120 bytes of the first packet into the block. Since the size of a block is 122 bytes, there will be one byte remaining. In this case, the server will add a Frame Header and set the LENGTH field to 0 and the LAST bit to 0 to indicate that there are no bytes belonging to the second packet in the current block.

If a Frame Header is inserted into the last byte of a block, the LENGTH field is set to 0. If a Frame Header is inserted into a block and it is not the last byte, the LENGTH field is set to 0 to indicate that the byte immediately following it is also a Frame Header.

Fragmentation Mode

For an IP Datacast Service, upper layer packets can get fragmented into blocks that appear in two different superframes. For example, referring again to FIG. 10, blocks 1 and 2 could be sent in one superframe and block 3 and 4 could be sent in a subsequent superframe. Alternately, in order to reduce the buffering requirements for real-time services, only complete upper layer packets are sent in a superframe. That is to say that fragmentation does not occur across superframe boundaries. In an embodiment, the Framing protocol can be configured to be in one of the following two modes.

Fragmentation Across Superframe Boundaries Allowed

In this mode, the Framing protocol allows fragmentation to occur across superframe boundaries.

Fragmentation Across Superframe Boundaries Not Allowed

In this mode, the Framing protocol does not allow fragmentation to occur across superframe boundaries.

Handling Base and Enhancement Sub-Flow Padding

Some flows in the system are configured to support layered transmission mode over the Physical layer. The two transmission layers are called the Base layer and the Enhancement layer. From the Transport layer point of view, such flows have two sub-flows, the Base sub-flow and the Enhancement sub-flow. In an embodiment, a restriction is imposed by the Physical layer so that the number of blocks sent in a superframe over the Base and Enhancement sub-flows must be the same. In an embodiment, the Framing protocol in the Transport layer implements this restriction.

It will be assumed that the Application Layer sends different amounts of data over the Base and Enhancement sub-flows and that they fragment to a different number of blocks. In an embodiment, the Framing protocol will add padding blocks to the sub-flow which has the smaller number of blocks to make the number of blocks of the two sub-flows equal.

If padding blocks are added to a sub-flow, the LAST bit of the Frame Header of each padding block is set to a value of 1. If padding blocks are added to a sub-flow, the LENGTH field of the Frame Header of each padding block is set to a value of 127. If padding blocks are added to a sub-flow, the value of the padding bytes of each padding block is set to 0.

Figure 12:
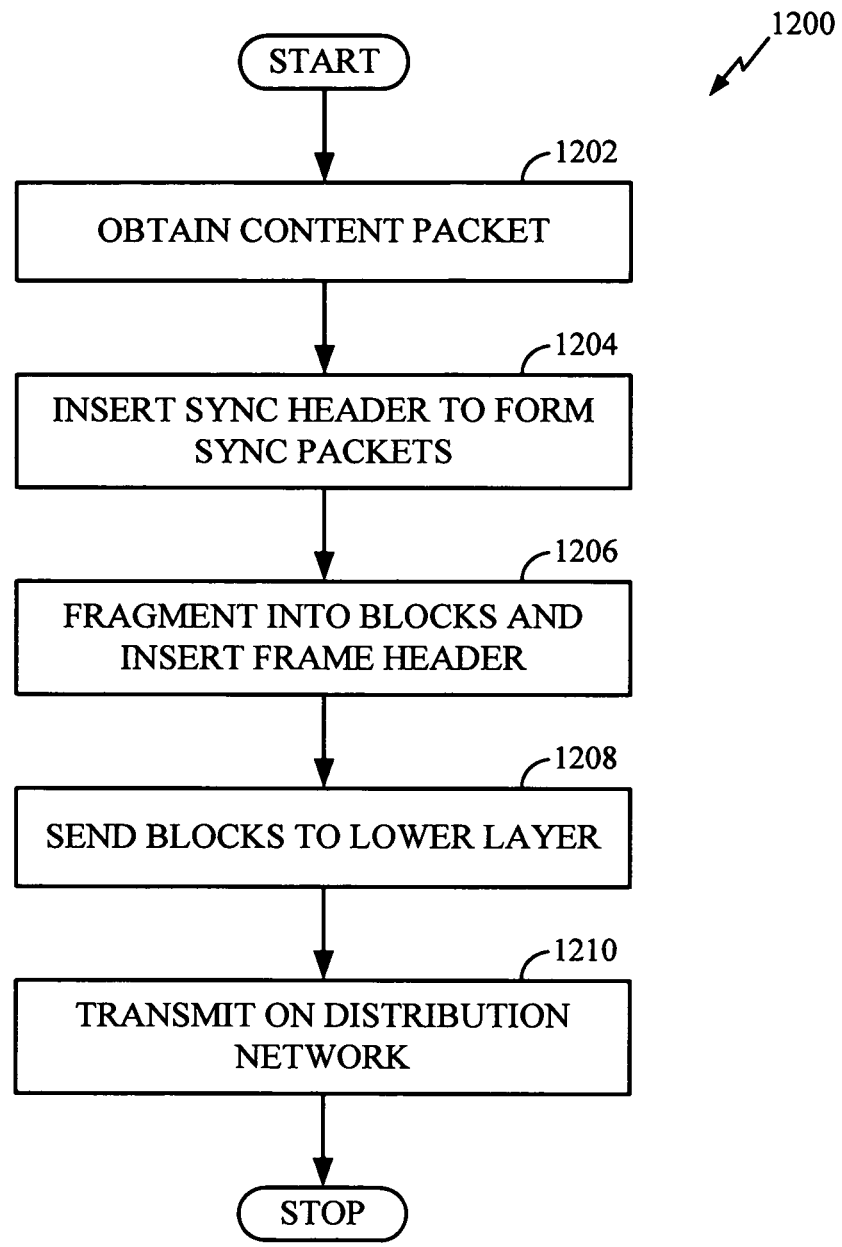
FIG. 12 shows an embodiment of a method for providing a packetization system.

FIG. 12 shows an embodiment of a method 1200 for providing a packetization system. For example, the method 1200 is suitable for use by the server 200 shown in FIG. 2. For clarity the method 1200 will be discussed with reference to the packetization protocols and layers described above.

At block 1202, content packets are obtained for distribution on a distribution network. For example, content is input to a real time Content layer provided of an Application layer. The Content layer operates to encode the content and output the content packets. For example, in an embodiment, the Content layer is the Content layer 502 shown in FIG. 5.

At block 1204, Sync packets are produced. For example, in an embodiment, the content packets are input to a Sync layer that operates to insert a Sync Header to produce the Sync packets. In an embodiment, the Sync layer is the Sync layer 504 shown in FIG. 5 and operates according to the description of the Sync layer provided with reference to FIG. 7.

At block 1206, the Sync packets are fragmented into blocks and a Frame Header is added. In embodiment, the fragmentation is performed by a Transport layer. For example, the Transport layer 410 operates to fragment the Sync packets and add a Frame Header as described with reference to FIG. 10.

At block 1208, the blocks are sent to lower layers. For example, the blocks produced at block 1206 are sent to Stream, MAC, and Physical layers as illustrated and described with reference to FIG. 8.

At block 1210, the blocks are transmitted over a distribution network to one or more receiving devices. For example, the PLPs derived from the fragmented blocks are transmitted over a Physical layer that comprises the distribution network 106. Devices, such as device 102, which are in communication with the distribution network 106, may then receive the PLPs.

Thus, the method 1200 provides an embodiment of a packetization system for distributing content over a distribution network. It should be noted that the method 1200 represents just one implementation and the changes, additions, deletions, combinations or other modifications of the method 1200 are possible within the scope of the embodiments.

DEVICE PROCESSING

In an embodiment, a receiving device represents a device that can be activated to receive services over the network. The device has an integrated receiver that allows it to receive the FLO waveform and other features (e.g., audio and video quality, computational and storage capacity) necessary to render high quality multimedia content. In addition, the device is integrated into a multifunctional mobile platform with wireless IP data capability. This capability is used for transaction oriented operations that can be performed over any wireless IP connection (e.g., CDMA2000, Evolution Data Optimized [1xEV-DO] or WCDMA).

Service Discovery

System Information (SI) describes the list of available real-time, non-real-time, and IP Datacast Services. It lists the available services and the title and rating of shows available for viewing on these Services. The SI also carries information about the flows of each service and their media types (video, audio, text etc). The receiving device can discover the list of available services from the SI.

Delivery Concept

The steps performed by a device to receive a real-time service are as follows:
1. The user selects a service from the Program Guide UI on the device.
2. The device determines the flow IDs associated with the selected service from the current SI.
3. The device initiates the Protocol Stack and configures it with the flow ID(s), the Service Keys, and configuration information for the selected service.
4. The Protocol Stack receives data over the appropriate flow IDs and performs decryption and de-framing (i.e., de-packetization).
5. The Protocol Stack passes the received data to the audio or video decoder.
6. The decoder processes the received data and plays it using a selected media player.

Real Time Service Support

The packetization system supports one or more real-time service content providers who deliver continuous streams of content to the server.

Figure 13:
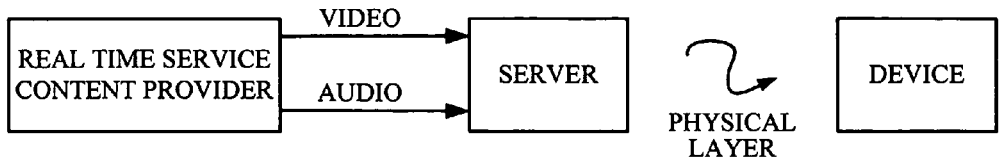
FIG. 13 shows a diagram that illustrates real time service support for use in a packetization system.

FIG. 13 shows a diagram that illustrates real time service support for use in a packetization system. For example, a content provider may deliver video and audio streams to the server 104 shown in FIG. 1. The following functions are then performed.

1. The server transcodes the received video and audio streams into specific coding formats.
2. The server multicasts these video and audio streams over the network.
3. The receiving devices interested in a real-time service "tune" to the appropriate flows and play the received streams.

Figure 14:
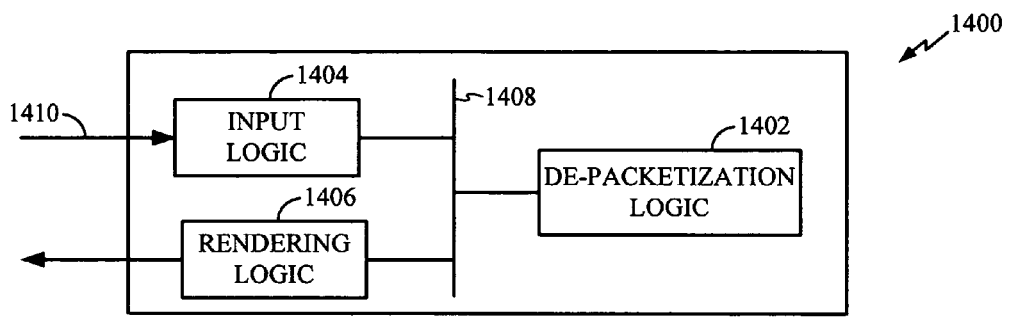
FIG. 14 shows an embodiment of a device for use in a packetization system.

FIG. 14 shows an embodiment of a device 1400 suitable for use in a packetization system. For example, the device 1400 may be used as the device 102 in FIG. 1. The device 1400 comprises de-packetization logic 1402, input logic 1404, and rendering logic 1406, all coupled to a data bus 1408. It should be noted that the device 1400 represents just one implementation and that other implementations are possible within the scope of the embodiments. For example, the device 1400 may comprise at least one processor configured to execute one or more program instructions to provide the functions of the packetization system described herein.

In one or more embodiments, the de-packetization logic 1402 comprises a CPU, processor, gate array, hardware logic, memory elements, virtual machine, software, and/or any combination of hardware and software. Thus, the de-packetization logic 1402 generally comprises logic to execute machine-readable instructions and to control one or more other functional elements of the device 1400 via the data bus 1408.

The input logic 1404 comprises hardware and/or software that operate to allow the device 1400 to receive packetized content from a distribution network through communication channel 1410. For example, in an embodiment, the communication channel 1410 comprises any suitable type of communication link to allow the device 1400 to communicate directly with servers or with one or more data networks and/or devices coupled to those data networks. For example, the communication channel 1410 provides a unicast, multicast, broadcast, or any other type of communication channel that allows the device 1400 to receive packetized content over a distribution network.

The rendering logic 1406 comprises hardware and/or software that operate to allow the device 1400 to render received content. For example, in an embodiment, received packetized content may represent audio or video information that can be rendered by the rendering logic 1406.

During operation of an embodiment, packetized content is received at the input logic 1404 through input channel 1410. The de-packetization logic 1402 operates to provide protocol layers through which the received packetized content is de-packetized. In an embodiment, the de-packetization logic 1402 operates to provide one or more protocol layers that are used to process Sync Headers, Frame Headers, presentation time stamps, and checksums included in the packetized content. The protocol layers operate to reverse a packetization process to extract audio and video content from received packets. A more detailed description of the de-packetization logic 1402 and the functions performed by protocol layers is provided in other sections of this document.

In an embodiment, the packetization system comprises a computer program having one or more program instructions ("instructions") stored on a computer-readable medium, which when executed by at least one processor, for instance, the de-packetization logic 1402, provides the functions of the packetization system described herein. For example, instructions may be loaded into the device 1400 from a computer-readable media, such as a floppy disk, CDROM, memory card, FLASH memory device, RAM, ROM, or any other type of memory device or computer-readable medium that interfaces to the device 1400. In another embodiment, the instructions may be downloaded into the device 1400 from an external device or network resource that interfaces to the device 1400. The instructions, when executed by the de-packetization logic 1402, provide one or more embodiments of a packetization system as described herein.

Thus, the device 1400 operates to provide embodiments of a packetization system to efficiently de-packetize multiplexed content flows received over a distribution network to obtain content that is rendered at the device.

Figure 15:
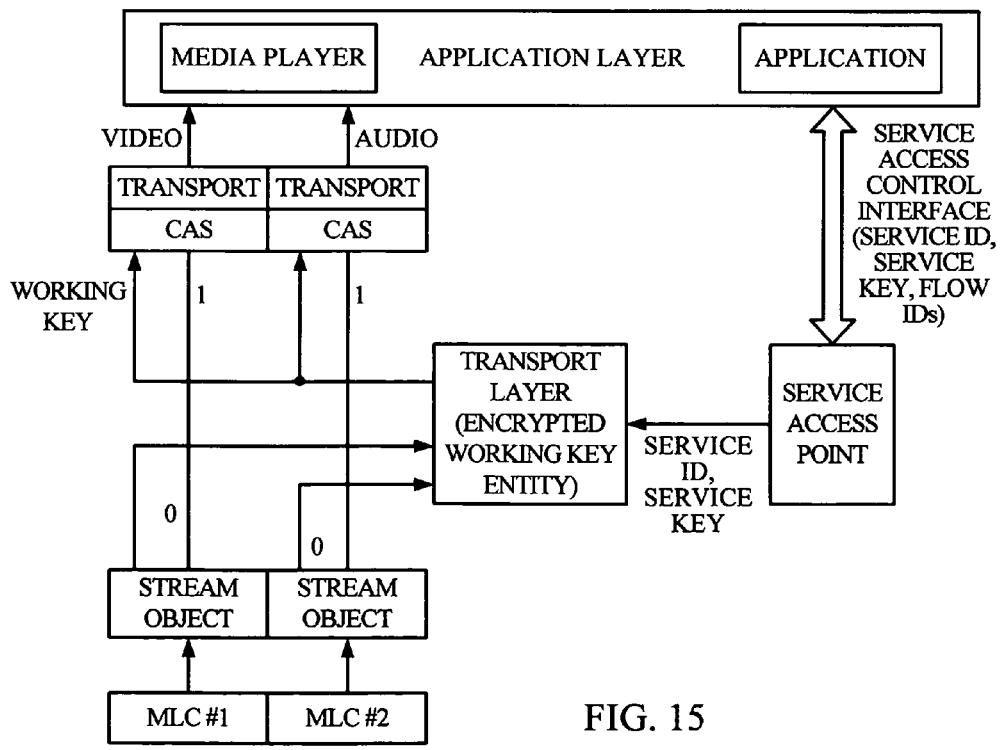
FIG. 15 shows an example of data and control flow at a receiving device for receiving a real-time service in a packetization system.

FIG. 15 shows an example of data and control flow at a receiving device for receiving a real-time service in a packetization system. Video and audio flows are received on two different MLCs. It is assumed that an encrypted working key is delivered on Stream 0 of the MLCs. The video and audio flows are processed by the layers and protocols of a packetization system so that the video and audio content can be rendered at the device. For example, in an embodiment, the layers and protocols are implemented by the de-packetization logic 1402.

Packet Reassembly at the Device

The Framing protocol of the Transport layer that is implemented by the de-packetization logic 1402 on the device reassembles the Application layer packets from the received Stream layer blocks. For each block received, the device reads the first byte (the Framing Header). The LENGTH field indicates the number of bytes in the block belonging to the upper layer packet. The LAST bit indicates whether the current fragment is the last fragment of the upper layer packet. If the LAST bit is set to 1, then all the fragments of the packet have been received. The Framing protocol can deliver the received bytes to the upper layer as a complete packet. It can also deliver information about the length of the reassembled packet to the upper layers.

Figure 16:
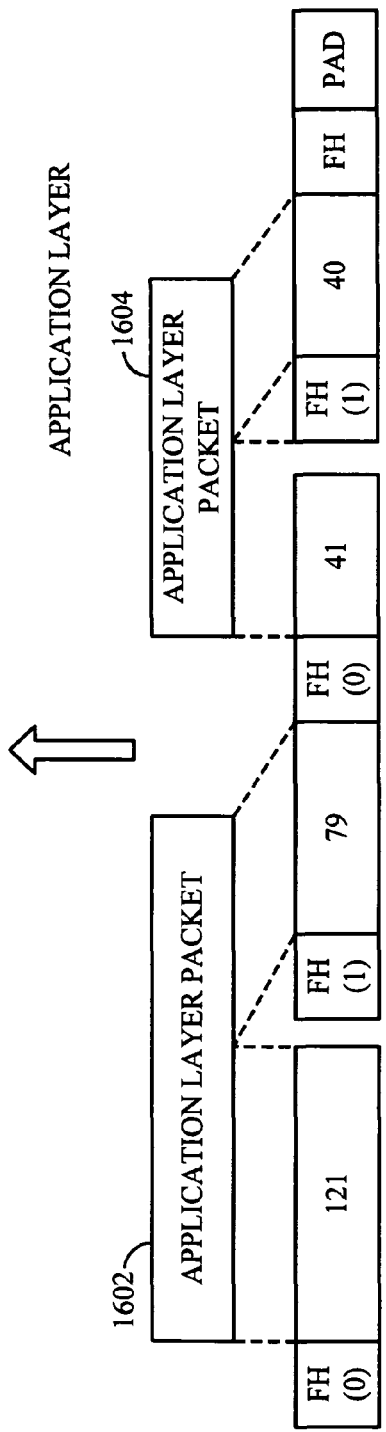
FIG. 16 illustrates how an embodiment of a packetization system operates at a device to process three received blocks that contain two Application layer packets.

FIG. 16 illustrates how an embodiment of a packetization system operates at a device to process three received blocks that contain two Application layer packets. The 121 bytes of the first block along with the 79 bytes of the second block form the first packet 1602. The LAST bit of the first frame header of the second block is set to 1 to indicate that it is the last fragment of the packet. The second Frame Header of the second block has the LENGTH field set to 41 and the LAST bit set to 0. This fragment is the beginning of the second packet 1604. The first frame header of the third block has the LENGTH field set to 40 and the LAST bit set to 1. The device can reassemble the 81 bytes of the second packet from the second and third blocks. The second frame header in the third block has the LENGTH field set to 127 and the LAST bit set to 1 indicating that the rest of the bytes are PAD bytes.

Error Handling

An important task of the Transport layer is handling erroneous PLPs. The underlying Stream layer marks certain blocks as erroneous if the lower layer CRC checks fail. This following describes the rules to be followed by the Transport layer for processing these erroneous blocks.

When the Stream layer marks a block as erroneous, none of its contents can be trusted. Therefore, the Transport layer must assume some default value for the Frame Header. The Transport layer on the device shall assume that the Frame Header (the first byte) of an erroneous block has the LAST bit set to 0 and the LENGTH field set to 121. That is, the Transport layer assumes that the block belongs to an upper layer packet already being reassembled or if there is no such packet, the first fragment of such a packet. The Transport layer then continues to process the other blocks and reassemble upper layer packets accordingly. In addition, the Transport layer marks an upper layer packet as "erroneous" if at least one fragment of that packet was received in a block that was erroneous.

Figure 17:
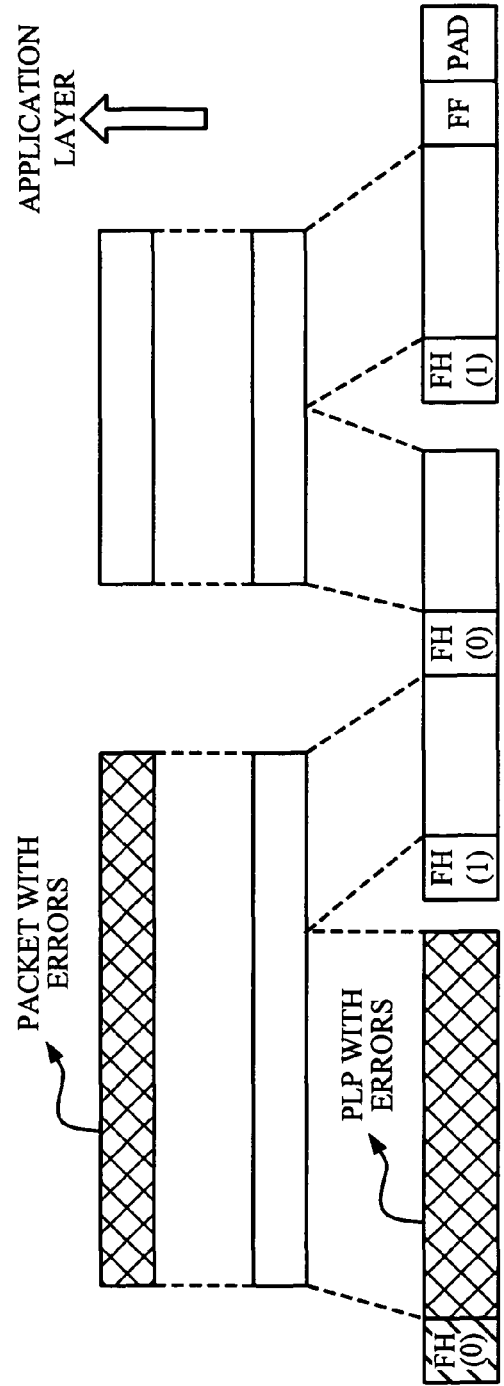
FIG. 17 shows the operation of a packetization system where a Stream layer indicates that a first received block has errors.

FIG. 17 shows the operation of a packetization system where a Stream layer indicates that a first received block has errors. In this case, the Transport layer processes the blocks assuming that the first Frame Header has the LAST bit set to 0 and the LENGTH field set to 121. In this case, the default value assumed by the Transport layer happens to be the actual value. The Transport layer also marks the reconstructed upper layer packet as erroneous.

Figure 18:
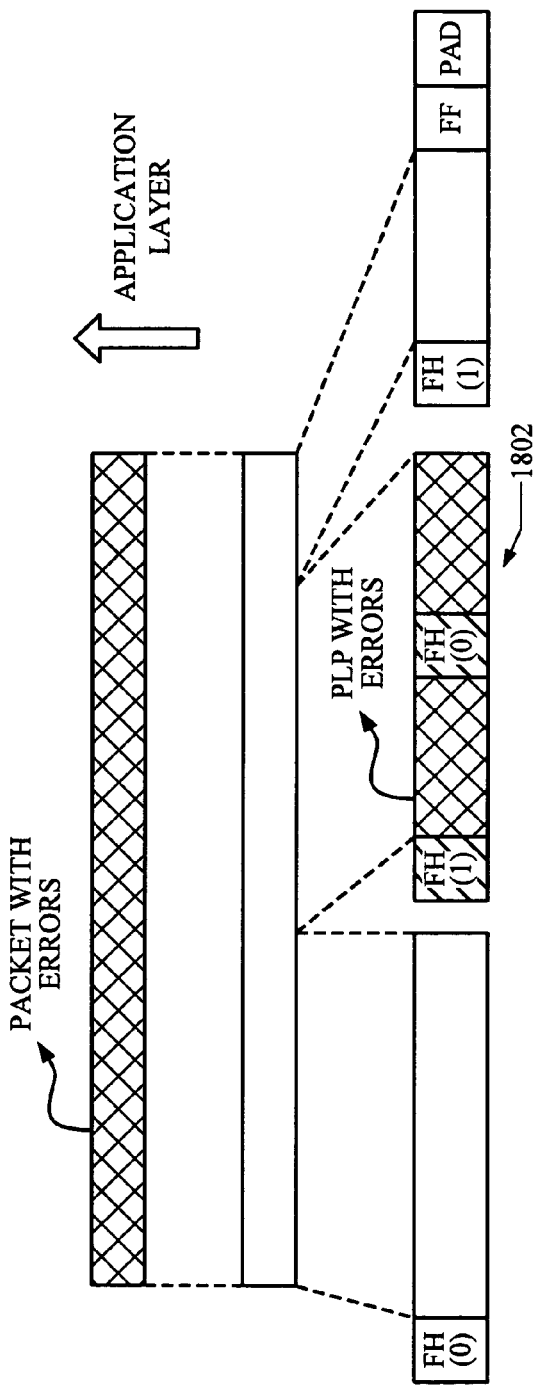
FIG. 18 shows the operation of a packetization system where a Stream layer indicates that a second received block is in error.

FIG. 18 shows the operation of a packetization system where a Stream layer indicates that a second received block 1802 is in error. As described earlier, the Transport layer assumes that the Frame Header of this erroneous block has the LAST bit set to 0 and the LENGTH field set to 121. It then continues processing the rest of the blocks. The reconstructed upper layer packet is marked as erroneous by the Transport layer. As shown in FIG. 18, the second block 1802 actually contains fragments of two upper layer packets. However, the Transport layer only delivers one upper layer packet containing both of them. In addition, the second Frame Header in the second block will also be present in the upper layer packet because the Transport layer cannot find the packet boundaries and detect this Frame Header.

Handling Errors in the Last Block of a Superframe

Figure 19:
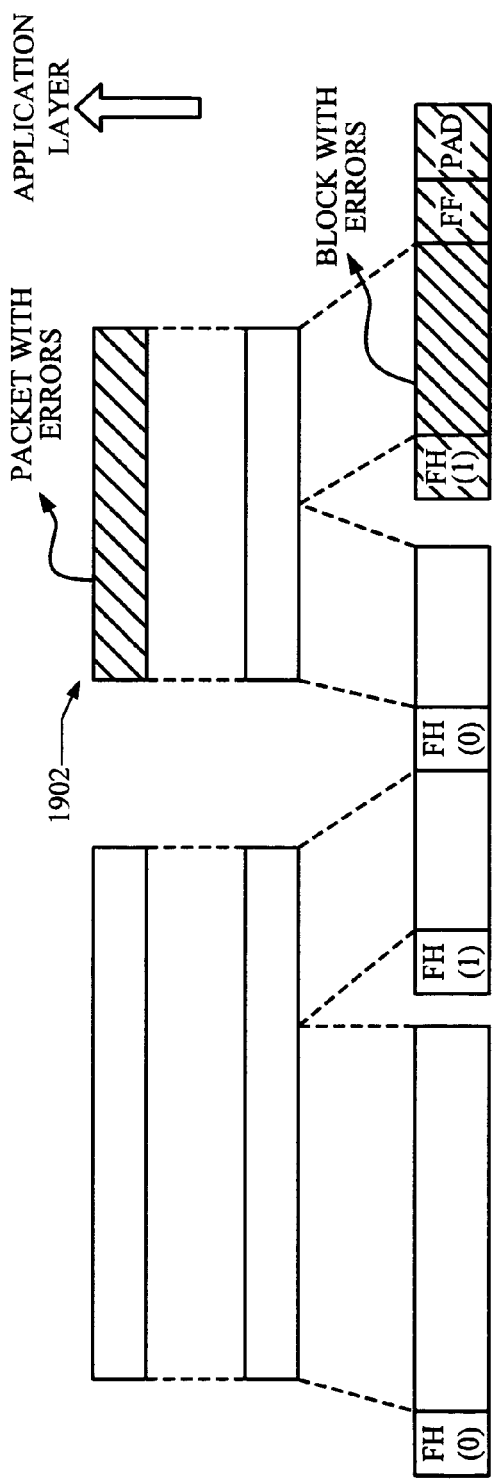
FIG. 19 shows the operation of a packetization system where a Stream layer marks the last block of a superframe to be in error.

FIG. 19 shows the operation of a packetization system where a Stream layer marks the last block of a superframe to be in error. The behavior of the Transport layer on the device is different depending on the mode of the Framing protocol. If the mode of the Framing protocol allows fragmentation across superframe boundaries, then the Transport layer on the device will treat this in the same way as described previously. That is, it assumes that the Frame Header has the LAST bit set to 0 and the LENGTH field set to 121. The Transport layer will continue processing the blocks received in subsequent superframes using this assumption. In this case, the resulting behavior of the Transport layer is similar to the case when an error occurs in any other block.

If the last block of a superframe is marked to be in error and the mode of the Framing protocol does not allow fragmentation across superframe boundaries, the Transport layer on the device assumes that the Frame Header (the first byte) has the LAST bit set to 1 and the LENGTH field set to 121.

If the last block of a superframe is marked to be in error and the mode of the Framing protocol allows fragmentation across superframe boundaries, the Transport layer on the device shall assume that the Frame Header (the first byte) has the LAST bit set to 0 and the LENGTH field set to 121.

The Transport layer will then reconstruct the upper layer packet 1902 and mark it as erroneous as shown in FIG. 19. In this case, the reconstructed upper layer packet may contain additional data including PAD bytes, Frame Headers, and even complete packets.

If the mode of the Framing protocol allows fragmentation across superframe boundaries, the Transport layer discards the incomplete upper layer packet (if present) if the rest of blocks are not received within a selected time period ($T_{FRAG}$).

Handling Illegal Values of LENGTH Field

If the LENGTH field of a Frame Header is set to a value outside the valid range and the block is not marked to be in error, the device shall regard that block to be in error and process it accordingly.

Framing Directory Protocol

As described above, the Framing protocol allows erroneous packets to be delivered to the Application layer with an appropriate error indication.

FIG. 20 shows the operation of a packetization system where a Stream layer delivers three blocks to the Transport layer. Of these, the second block 2002 is marked to be erroneous. The default processing by the Framing protocol for erroneous blocks was described in the previous section. The Framing Protocol will reassemble the three blocks into one packet 2004 and mark it as erroneous. Note that the resulting packet has the data bytes from the second block as well as the middle Frame Header present in the second block.

In an embodiment, a Transport layer Framing Directory protocol message is provided by some extra signaling information sent on Stream 0 to provide additional error robustness at the device. The Transport layer Framing Directory protocol message contains information about packet boundaries that allows the device to detect the extra Frame Header that was inserted and remove it. The device can then deliver two transport layer packets to the application and mark both of them as erroneous.

Structure of the Framing Directory

The format of the Framing Directory protocol message is specified in Table 10 as follows.

TABLE 10

| Field Name | Field Type |
|---|---|
| MESSAGE_ID | UINT(8) |
| FLOW_ID | UINT(20) |
| SIZE_OF_BLOCK_OFFSET | UINT(4) |
| NUMBER_OF_PACKETS | UINT(8) |
| DIRECTORY_RECORDS | DIRECTORY_RECORD_TYPE |
| RESERVED | BIT(1 ... 7) |

MESSAGE_ID

The MESSAGE_ID field is used to indicate that the message is a Framing Directory message. For Framing Directory messages, the MESSAGE_ID field is set to FRAMING_DIRECTORY (3).

FLOW_ID

This field represents the flow identifier for which the Framing Directory message is being sent. The Framing Directory message is specific to the flow specified by FLOW_ID. Since the message is associated with the flow, the server sends this message only on the Stream 0 of the MLC that supports the flow. The server sends the Framing Directory message on the Stream 0 associated with the flow specified by FLOW_ID.

SIZE_OF_BLOCK_OFFSET

This field represents the size (in bits) of the BLOCK_OFFSET field used in the message. The SIZE_OF_BLOCK_OFFSET field is set to a value between 1 and 15.

NUMBER_OF_PACKETS

This field indicates the number of packets being sent in the current superframe for the specified flow ID.

DIRECTORY_RECORDS

There are NUMBER_OF_PACKETS instances of DIRECTORY_RECORDS. Each record indicates where Application layer packets end. The format of the DIRECTORY_RECORDS is specified in Table 11 as follows.

TABLE 11

| Field Name | Field Type |
|---|---|
| BLOCK_OFFSET | UINT(SIZE_OF_BLOCK_OFFSET) |
| BYTE_OFFSET | UINT(7) |

BLOCK_OFFSET

For the first DIRECTORY_RECORD in the message, the BLOCK_OFFSET field is the number of blocks (from the beginning) where the first packet end boundary is present. For subsequent DIRECTORY_RECORDS, the BLOCK_OFFSET is the number of blocks relative to the previous block where a packet end boundary was present. The number of bits of the BLOCK_OFFSET field is given by the SIZE_OF_BLOCK_OFFSET field of the message. For example, suppose SIZE_OF_BLOCK_OFFSET is set to 2. This means that the number of bits used to represent the BLOCK_OFFSET field is 2. Distances between Blocks can range from 0 to 3.

BYTE_OFFSET

This field is the number of bytes within the block where the packet ends. The valid range of the BYTE_OFFSET field is 1 through 121.

RESERVED

The RESERVED bits are added to make the Framing Directory message byte aligned. The RESERVED bits in the Framing Directory message are set to 0. The Framing Directory mechanism is used when the Framing protocol mode does not allow fragmentation across superframe boundaries. An example of the Framing Directory structure for the fragmentation shown in FIG. 18 is provided in Table 12 as follows.

TABLE 12

| Field | Value |
|---|---|
| NUMBER_OF_PACKETS | 2 |
| BLOCK_OFFSET[0] | 2 |
| BYTE_OFFSET[0] | 40 |
| BLOCK_OFFSET[1] | 1 |
| BYTE_OFFSET[1] | 100 |

FIG. 21 shows the operation of a packetization system where Framing directory information is used at a receiving device to detect that there is a packet boundary at byte 40 of a second block. The device can then remove the Frame Header and deliver two Transport layer packets marked as erroneous.

If padding blocks are added to the Base or Enhancement sub-flows, the Framing Directory shall mark the last valid packet end boundary and treat the rest of the bytes as a padding packet. The padding packet recovered from a sub-flow will be discarded by the Framing protocol.

Since similar information about packet sizes can be obtained from the Framing Directory as well as the packet fragments, the device may give precedence to the information in the packet fragments and use the Framing Directory only in the case of packet errors.

Checksum Protocol

Consider a service whose Framing Protocol uses the mode where fragmentation across superframe boundaries is allowed. Now suppose that a device starts receiving Stream layer blocks from some superframe. The device will not know if fragments of the first upper layer packet were sent in previous superframes. Therefore, even if blocks are received without error, the first upper layer packet may be incomplete. The Framing protocol as specified in the previous section does not treat this as a special case. Similarly, incomplete or erroneous upper layer packets may be produced if the device misses complete superframes (i.e., due to a degraded transmission channel). A Checksum protocol is provided to detect and avoid situations where the Framing protocol may deliver incomplete packets to the upper layer. This is an optional protocol that can be implemented on a per-flow basis. The Checksum protocol may also be used to provide an additional level of integrity checking if the lower layer CRC check declares a packet to be good even in the presence of errors (false negatives). The following describes the operation of a packetization system to incorporate checksums at a server during the packetization process.

FIG. 22 shows protocols belonging to the Transport layer. The Checksum protocol 2202 is implemented on top of the Framing Protocol 2204.

FIG. 23 shows how a Checksum protocol is provided on a server in a packetization system to add a 16-bit CRC to each upper layer packet. The expanded packet is then given to the Framing Protocol for fragmentation.

In an embodiment, a 16-bit field contains the Frame Checksum Sequence (FCS) for the higher layer packet. The FCS is calculated using an industry standard CRC-CCITT generator polynomial expressed as follows.

$$g(x)=x^{16}+x^{12}+x^5+1$$

The following describes the operation of a packetization system at a device to process checksums incorporated into packetized content. The Framing protocol of the packetization system operates on the device to reconstruct upper layer packets. The Checksum protocol at the device assumes that the last 2 bytes of a reconstructed upper layer packet are the 16-bits FCS (i.e., received CRC bits). The Checksum protocol on the device computes a 16-bit CRC over the entire packet (excluding the two bytes at the end) and compares it with the received CRC bits. If there is a mismatch, the packet is marked as being in error. The Transport layer then removes the two CRC bytes of every packet and delivers the packet, its length, and any error indications to the upper layers.

FIG. 24 illustrates checksum processing at a receiving device in a packetization system. When the received CRC bits do not match the computed CRC bits the packet is marked for errors.

Figure 25:
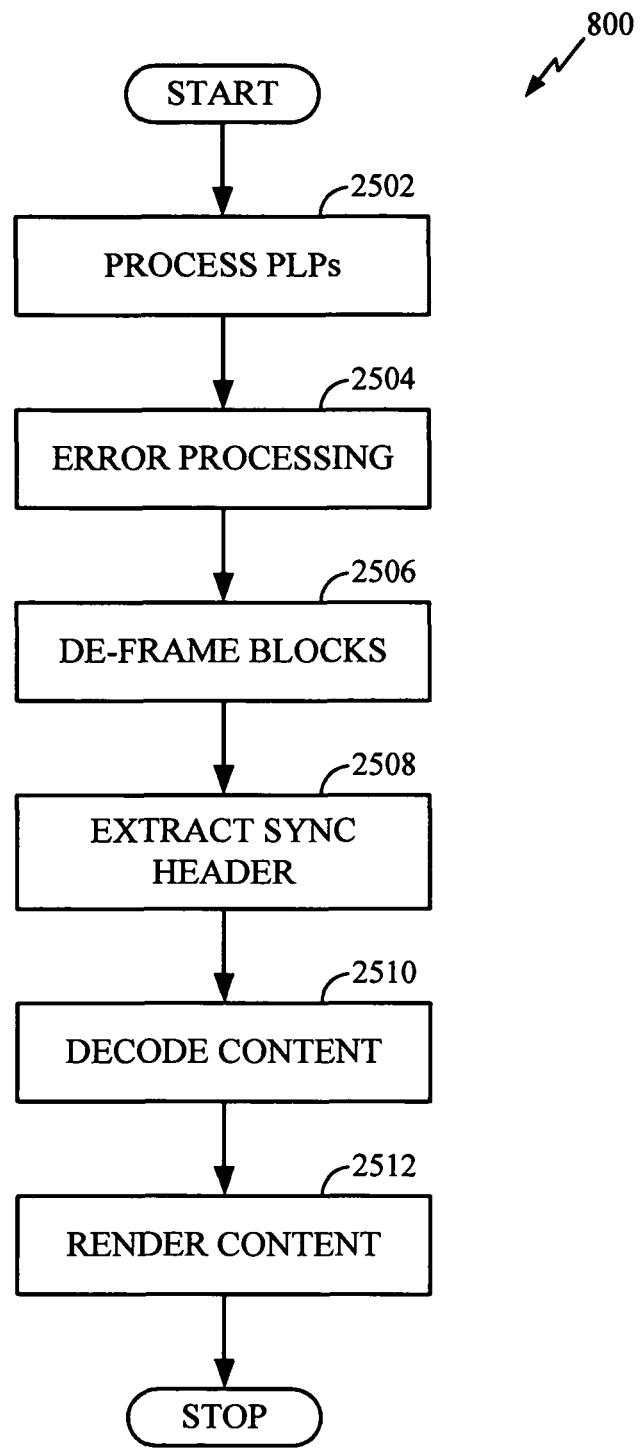
FIG. 25 shows an embodiment of a method for providing a packetization system.

FIG. 25 shows an embodiment of a method 2500 for providing a packetization system at a device. For example, the method 2500 is suitable for use by the device 1400 shown in FIG. 14. For clarity the method 2500 will be discussed with reference to the packetization protocols and layers described above.

At block 2502, Physical layer packets are received and processed. For example, the packets are received at the input logic 1404 of the device 1400 and processed by lower layers provided by the de-packetization logic 1402 to produce content blocks.

At block 2504, error processing is performed. In an embodiment, one or more content blocks may contain errors. For example, checksum processing may be performed as described above to determine content blocks with errors. When a content block with errors is detected, selected values in the corresponding Frame Headers are assumed to be default values. For example, the assumed or default values for the LENGTH and LAST parameters in Frame Headers associated with error blocks are described above. By assuming selected values the de-packetization system may continue to process those blocks to produce Application layer packets as described above. In an embodiment, the Application layer packets are marked to show that they contain errors. Thus, the de-packetization system operates to recover content even though some of the content may contain errors. In an embodiment, the de-packetization logic 1402 operates to perform error processing as described herein.

At block 2506, the content blocks are de-framed. For example, the de-packetization logic 1402 operates to de-frame the content blocks to produce Sync layer packets. For example, Frame Headers associated with the content blocks are processed to obtain the Sync layer packets.

At block 2508, the Sync Header of the Sync layer packets is extracted to produce Content layer packets. For example, the de-packetization logic 1402 operates to remove the Sync Headers are described above. The Sync Headers comprises presentation time stamps that are used to synchronize the rendering of the content.

At block 2510, the Content layer packets are decoded. For example, the de-packetization logic 1402 operates to decode audio and video content from the Content layer packets.

At block 2512, the content is rendered on the device. For example, the rendering logic 1406 operates to render the content on the device according to the presentation time stamps.

Thus, the method 2500 provides an embodiment of a packetization system for distributing content over a distribution network. It should be noted that the method 2500 represents just one implementation and the changes, additions, deletions, combinations or other modifications of the method 2500 are possible within the scope of the embodiments.

Figure 26:
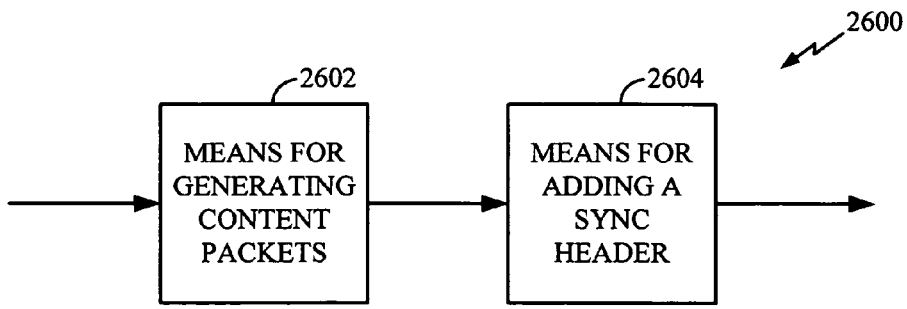
FIG. 26 shows an embodiment of a packetization system.

FIG. 26 shows an embodiment of a packetization system 2600. The packetization system 2600 comprises means (2602) for generating for generating one or more content packets, and means (2604) for adding a sync header. In an embodiment, the means (2602-2604) are provided by at least one processor executing a computer program to provide embodiments of a packetization system as described herein.

Figure 27:
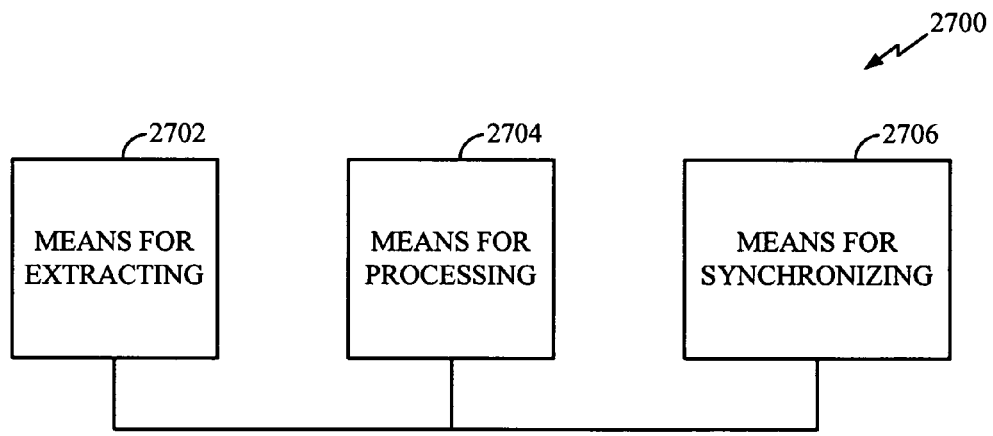
FIG. 27 shows an embodiment of a packetization system.

FIG. 27 shows an embodiment of a packetization system 2700. The packetization system 2700 comprises means (2702) for extracting, means (2704) for processing, and means (2706) for synchronizing. In an embodiment, the means (2702-2706) are provided by at least one processor executing a computer program to provide embodiments of a packetization system as described herein.

Figure 28:
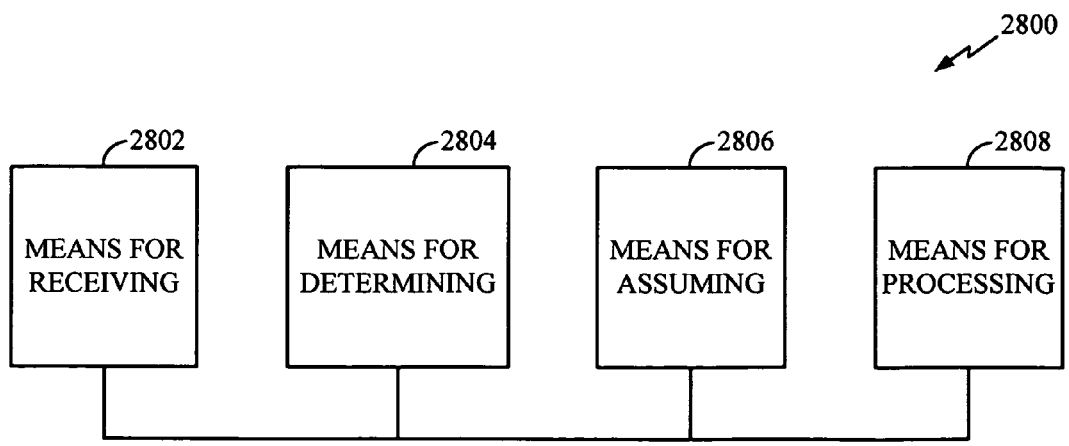
FIG. 28 shows an embodiment of a packetization system.

FIG. 28 shows an embodiment of a packetization system 2800. The packetization system 2800 comprises means (2802) for receiving, means (2804) for determining, means (2806) for assuming, and means (2808) for processing. In an embodiment, the means (2802-2808) are provided by at least one processor executing a computer program to provide embodiments of a packetization system as described herein.

Therefore various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

Accordingly, while embodiments of a packetization system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method comprising:
   generating a plurality of content packets associated with multimedia content;
   adding a sync header to each content packet to form a plurality of corresponding sync packets, wherein each sync header includes a packet presentation time stamp;
   generating a plurality of blocks corresponding to the plurality of sync packets, wherein each block includes at least a portion of a sync packet of the plurality of sync packets and a framing header corresponding to the portion of the sync packet included in each block, wherein a first block of the plurality of blocks includes a first framing header and includes at least a portion of a first sync packet, and wherein the first framing header included in the first block indicates a length of the portion of the first sync packet and whether the portion of the first sync packet is a last portion of the first sync packet; and
   generating a superframe that includes the plurality of blocks, wherein a first actual presentation time is associated with the first sync packet, wherein a first packet presentation time stamp is added to a superframe time to determine the first actual presentation time, and wherein the superframe time is obtained from overhead information symbols of the superframe.

2. The method of claim 1, wherein generating the plurality of content packets includes encoding the multimedia content to produce the plurality of content packets.

3. The method of claim 1, wherein the sync header includes a random access point identifier.

4. The method of claim 1, wherein the sync header includes a frame rate indicator.

5. The method of claim 1, wherein the sync header includes a component indicator that indicates whether a particular sync packet is associated with a base layer or an enhancement layer.

6. The method of claim 1, further comprising generating a sync layer directory, wherein the sync layer directory is associated with audio frames or is associated with video frames, and wherein the sync layer directory is transmitted in association with the plurality of blocks.

7. The method of claim 6, further comprising generating the sync layer directory to comprise a video reference indicator that indicates that a selected sync packet is associated with a selected type of video frame.

8. The method of claim 1, wherein the method includes determining whether a fragmentation mode is a first fragmentation mode or a second fragmentation mode, wherein the first fragmentation mode indicates that portions of a particular sync layer packet may be included in blocks of different superframes, wherein the second fragmentation mode indicates that the portions of the particular sync layer packet may not be included in blocks of different superframes, and wherein the plurality of blocks are generated for transmission in one or more superframes based on a determined fragmentation mode.

9. The method of claim 5, wherein the plurality of blocks are generated and transmitted based on a determination of whether a number of blocks sent in a superframe over the base layer and the enhancement layer must be the same.

10. An apparatus for packetization of multimedia content for distribution over a network, the apparatus comprising:
    encoding logic configured to generate a plurality of content packets based on the multimedia content;
    packetization logic configured to add a sync header to each content packet to form a plurality of corresponding sync packets, wherein each sync header includes a packet presentation time stamp;
    framing logic configured to generate a plurality of blocks corresponding to the plurality of sync packets, wherein each block includes at least a portion of a sync packet of the plurality of sync packets and a framing header corresponding to the portion of the sync packet included in each block, wherein a first block of the plurality of blocks includes a first framing header and includes at least a portion of a first sync packet, and wherein the first framing header included in the first block indicates a length of the portion of the first sync packet and whether the portion of the first sync packet is a last portion of the first sync packet; and
    superframe logic configured to generate a superframe that includes the plurality of blocks, wherein a first actual presentation time is associated with the first sync packet, wherein a first packet presentation time stamp is added to a superframe time to determine the first actual presentation time, and wherein the superframe time is obtained from overhead information symbols of the superframe.

11. The apparatus of claim 10, wherein the sync header includes a random access point identifier.

12. The apparatus of claim 10, wherein the sync header includes a frame rate indicator.

13. The apparatus of claim 10, wherein the sync header includes a component indicator that indicates whether a particular sync packet is associated with a base layer or an enhancement layer.

14. The apparatus of claim 10, wherein the packetization logic further comprises logic configured to generate a sync layer directory.

15. The apparatus of claim 14, wherein the sync layer directory includes a video reference indicator that indicates that a selected sync packet is associated with a selected type of video frame.

16. An apparatus for packetization of multimedia content for distribution over a network, the apparatus comprising:
    means for generating a plurality of content packets based on the multimedia content;

means for adding a sync header to each content packet to form a plurality of corresponding sync packets, wherein each sync header includes a packet presentation time stamp;

means for generating a plurality of blocks corresponding to the plurality of sync packets, wherein each block includes at least a portion of a sync packet of the plurality of sync packets and a framing header corresponding to the portion of the sync packet included in each block, wherein a first block of the plurality of blocks includes a first framing header and includes at least a portion of a first sync packet, and wherein the first framing header included in the first block indicates a length of the portion of the first sync packet and whether the portion of the first sync packet is a last portion of the first sync packet; and means for generating a superframe that includes the plurality of blocks, wherein a first actual presentation time is associated with the first sync packet, wherein a first packet presentation time stamp is added to a superframe time to determine the first actual presentation time, and wherein the superframe time is obtained from overhead information symbols of the superframe.

17. The apparatus of claim 16, wherein said means for generating includes means for encoding the multimedia content to produce the one or more content packets.

18. The apparatus of claim 16, wherein the sync header includes a random access point identifier.

19. The apparatus of claim 16, further comprising means for generating the sync header includes a frame rate indicator.

20. The apparatus of claim 16, wherein the sync header includes a component indicator that indicates whether a selected sync packet is associated with a base layer or an enhancement layer.

21. The apparatus of claim 16, further comprising means for generating a sync layer directory.

22. The apparatus of claim 21, wherein the sync layer directory includes a video reference indicator that indicates that a selected sync packet is associated with a selected type of video frame.

23. A computer-readable medium having a computer program comprising one or more instructions that, when executed by at least one processor, provide packetization of multimedia content for distribution over a network, the one or more instructions comprising:

instructions for generating a plurality of content packets based on the multimedia content;

instructions for adding a sync header to each content packet to form a plurality of corresponding sync packets, wherein each sync header includes a packet presentation time stamp; and instructions for generating a plurality of blocks corresponding to the plurality of sync packets, wherein each block includes at least a portion of a sync packet of the plurality of sync packets and a framing header corresponding to the portion of the sync packet included in each block, wherein a first block of the plurality of blocks includes a first framing header and includes at least a portion of a first sync packet, and wherein the first framing header included in the first block indicates a length of the portion of the first sync packet and whether the portion of the first sync packet is a last portion of the first sync packet; and instructions for generating a superframe that includes the plurality of blocks, wherein a first actual presentation time is associated with the first sync packet, wherein a first packet presentation time stamp is added to a superframe time to determine the first actual presentation time, and wherein the superframe time is obtained from overhead information symbols of the superframe.

24. The computer program of claim 23, wherein said instructions for generating comprise instructions for encoding the multimedia content to produce the one or more content packets.

25. The compute program of claim 23, wherein the sync header includes a random access point identifier.

26. The computer program of claim 23, wherein the sync header includes a frame rate indicator.

27. The computer program of claim 23, wherein the sync header includes a component indicator that indicates whether a selected application layer packet is associated with a base layer or an enhancement layer.

28. The computer program of claim 23, further comprising instructions for generating a sync layer directory.

29. The computer program of claim 28, wherein the sync layer directory includes a video reference indicator that indicates that a selected sync packet is associated with a selected type of video frame.

30. At least one processor configured to perform a method for packetization of multimedia content for distribution over a network, the method comprising:

generating a plurality of content packets from multiple channels of multimedia content;

adding a sync header to each content packet to form a plurality of corresponding sync packets, wherein each sync header includes a packet presentation time stamp;

generating a plurality of blocks corresponding to the plurality of sync packets, wherein each block includes at least a portion of a sync packet of the plurality of sync packets and a framing header corresponding to the portion of the sync packet included in each block, wherein a first block of the plurality of blocks includes a first framing header and includes at least a portion of a first sync packet, and wherein the first framing header included in the first block indicates a length of the portion of the first sync packet and whether the portion of the first sync packet is a last portion of the first sync packet; and generating a superframe that includes the plurality of blocks, wherein a first actual presentation time is associated with the first sync packet, wherein a first packet presentation time stamp is added to a superframe time to determine the first actual presentation time, and wherein the superframe time is obtained from overhead information symbols of the superframe.

31. The method of claim 30, wherein said generating comprises encoding the multimedia content to produce the plurality of content packets.

32. The method of claim 30, wherein the synch header includes a random access point identifier.

33. The method of claim 30, wherein the sync header includes a frame rate indicator.

34. The method of claim 30, wherein the sync header includes a component indicator that indicates whether a selected sync packet is associated with a base layer or an enhancement layer.

35. The method of claim 30, further comprising generating a sync layer directory.

36. The method of claim 35, wherein the sync layer directory includes a video reference indicator that indicates that a selected sync packet is associated with a selected type of video frame.

37. A method for processing packets corresponding to multimedia content distributed over a network, the method comprising:

processing a superframe to produce a plurality of sync packets and to obtain a superframe time, wherein the superframe time is obtained from overhead information symbols of the superframe;

extracting a sync header from each sync packet to produce a plurality of corresponding content layer packets, wherein each sync header includes a presentation time stamp; and synchronizing each content layer packet based on an actual presentation time associated with each content layer packet, wherein a particular actual presentation time is associated with a particular content packet, wherein a particular presentation time stamp is included in a particular sync header associated with the particular content packet, and wherein the particular presentation time stamp is added to the superframe time to determine the particular actual presentation time.

38. The method of claim 37, further comprising extracting a random access point identifier from the particular sync header.

39. The method of claim 37, further comprising extracting a frame rate indicator from the particular sync header.

40. The method of claim 37, further comprising extracting a component indicator from the particular sync header, wherein the component indicator indicates whether a selected sync packet is associated with a base layer or an enhancement layer.

41. The method of claim 37, further comprising receiving a sync layer directory.

42. The method of claim 41, further comprising extracting a video reference indicator from the sync layer directory, wherein the video reference indicator indicates that a selected sync packet is associated with a selected type of video frame.

43. An apparatus for preprocessing packets corresponding to multimedia content distributed over a network, the apparatus comprising:

receiving logic configured to process a superframe to produce a plurality of sync packets and to obtain a superframe time, wherein the superframe time is obtained from overhead information symbols of the superframe; and de-packetization logic configured to extract a sync header from each sync packet to produce content layer packets, wherein each sync header includes a presentation time stamp, and to synchronize each content layer packet based on an actual presentation time associated with each content layer packet, wherein a particular actual presentation time is associated with a particular content packet, wherein a particular presentation time stamp is included in a particular sync header associated with the particular content packet, and wherein the particular presentation time stamp is added to the superframe time to determine the particular actual presentation time.

44. The apparatus of claim 43, wherein the de-packetization logic further comprises logic configured to extract a random access point identifier from the particular sync header.

45. The apparatus of claim 43, wherein the de-packetization logic further comprises logic configured to extract a frame rate indicator from the particular sync header.

46. The apparatus of claim 43, wherein the de-packetization logic further comprises logic configured to extract a component indicator from the particular sync header, wherein the component indicator indicates whether a selected sync packet is associated with a base layer or an enhancement layer.

47. The apparatus of claim 43, wherein the de-packetization logic further comprises logic configured to receive a sync layer directory.

48. The apparatus of claim 47, wherein the de-packetization logic further comprises logic configured to extract a video reference indicator from the sync layer directory, wherein the video reference indicator indicates that a selected sync packet is associated with a selected type of video frame.

49. An apparatus for processing packets corresponding to multimedia content for distribution over a network, the apparatus comprising:

means for processing a superframe to produce a plurality of sync packets and to obtain a superframe time, wherein the superframe time is obtained from overhead information symbols of the superframe;

means for extracting a sync header from each application layer packet to produce a plurality of corresponding content layer packets, wherein each sync header includes a presentation time stamp; and means for synchronizing each content layer packet based on an actual presentation time associated with each content layer packet, wherein a particular actual presentation time is associated with a particular content packet, wherein a particular presentation time stamp is included in a particular sync header associated with the particular content packet, and wherein the particular presentation time stamp is added to the superframe time to determine the particular actual presentation time.

50. The apparatus of claim 49, further comprising means for extracting a random access point identifier from the particular sync header.

51. The apparatus of claim 49, further comprising means for extracting a frame rate indicator from the particular sync header.

52. The apparatus of claim 49, further comprising means for extracting a component indicator from the particular sync header, wherein the component indicator indicates whether a selected sync packet is associated with a base layer or an enhancement layer.

53. The apparatus of claim 49, further comprising means for receiving a sync layer directory.

54. The apparatus of claim 53, further comprising means for extracting a video reference indicator from the sync layer directory, wherein the video reference indicator indicates that a selected sync packet is associated with a selected type of video frame.

55. A computer-readable medium having a computer program comprising instructions, which when executed by at least one processor, operate to process packets corresponding to multimedia content distributed over a network, the computer program comprising:

instructions for processing a superframe to produce a plurality of sync packets and to obtain a superframe time, wherein the superframe time is obtained from overhead information symbols of the superframe;

instructions for extracting a sync header from each sync packet to produce a plurality of corresponding content layer packets, wherein each sync header includes a presentation time stamp; and instructions for synchronizing the content layer packets based on an actual presentation time associated with each content layer packet, wherein a particular actual presentation time is associated with a particular content packet, wherein a particular presentation time stamp is included in a particular sync header associated with the particular content packet, and wherein the particular presentation time stamp is added to the superframe time to determine the particular actual presentation time.

56. The computer program of claim 55, further comprising instructions for extracting a random access point identifier from the particular sync header.

57. The computer program of claim 55, further comprising instructions for extracting a frame rate indicator from the particular sync header.

58. The computer program of claim 55, further comprising instructions for extracting a component indicator from the particular sync header, wherein the component indicator indicates whether a particular sync packet is associated with a base layer or an enhancement layer.

59. The computer program of claim 55, further comprising instructions for receiving a sync layer directory.

60. The computer program of claim 59, further comprising instructions for extracting a video reference indicator from the sync layer directory, wherein the video reference indicator indicates that a selected sync packet is associated with a selected type of video frame.

61. At least one processor configured to perform operations to process packets corresponding to multimedia content distributed over a network, the operations comprising:

processing a superframe to produce a plurality of sync packets and to obtain a superframe time, wherein the superframe time is obtained from overhead information symbols of the superframe;

extracting a sync header from each sync packet to produce a plurality of corresponding content layer packets, wherein each sync header includes a presentation time stamp; and synchronizing each content layer packet based on an actual presentation time associated with each content layer packet, wherein a particular actual presentation time is associated with a particular content packet, wherein a particular presentation time stamp is included in a particular sync header associated with the particular content packet, and wherein the particular presentation time stamp is added to the superframe time to determine the particular actual presentation time.

62. The at least one processor of claim 61, the operations further comprising extracting a random access point identifier from the particular sync header, and a frame rate indicator from the particular sync header.

63. The at least one processor of claim 61, the operations further comprising extracting a component indicator from the particular sync header, wherein the component indicator indicates whether a selected sync packet is associated with a base layer or an enhancement layer.

64. The at least one processor of claim 61, the operations further comprising receiving a sync layer directory, and extracting a video reference indicator from the sync layer directory, wherein the video reference indicator indicates that a selected sync packet is associated with a selected type of video frame.

* * * * *